(12) United States Patent
Yu et al.

(10) Patent No.: US 7,637,172 B2
(45) Date of Patent: Dec. 29, 2009

(54) ELECTRONIC DEVICE WITH SPEED MEASUREMENT AND OUTPUT GENERATION

(75) Inventors: Glenn Yu, San Marino, CA (US); Christopher Patrick Purcell, Westchester, CA (US); Eric C. Ostendorff, Torrance, CA (US); Steven M. Moran, Woodland Hills, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 11/855,012

(22) Filed: Sep. 13, 2007

(65) Prior Publication Data

US 2008/0066560 A1 Mar. 20, 2008

Related U.S. Application Data

(60) Provisional application No. 60/846,009, filed on Sep. 19, 2006.

(51) Int. Cl.
*G01C 22/00* (2006.01)
(52) U.S. Cl. .................................. 73/861.65
(58) Field of Classification Search ............... 73/861.5, 73/182; 702/160, 141
See application file for complete search history.

(56) References Cited

U.S. PATENT DOCUMENTS

| | | | |
|---|---|---|---|
| 1,967,449 A | 7/1934 | Ostman | |
| 3,105,383 A | 10/1963 | Cartwright et al. | |
| 3,387,491 A | 6/1968 | Adams | |
| 3,678,474 A | 7/1972 | Brown | |
| 3,695,106 A | 10/1972 | Geisow | |
| 3,713,336 A | 1/1973 | Bernstein et al. | |
| 3,823,611 A | 7/1974 | Rudow et al. | |
| 4,078,426 A | 3/1978 | Casani et al. | |
| 4,091,667 A | 5/1978 | Anderson et al. | |
| 4,102,188 A | 7/1978 | Simerl | |
| 4,103,427 A | 8/1978 | Ledley, III | |
| 4,136,564 A | 1/1979 | Suzuki et al. | |
| 4,156,190 A | 5/1979 | Chittenden et al. | |
| 4,241,605 A | 12/1980 | Hendriks et al. | |
| 4,244,230 A | 1/1981 | Bauer | |
| 4,248,082 A | 2/1981 | Farmer | |
| 4,287,762 A | 9/1981 | Baer | |
| 4,463,613 A | 8/1984 | Schmittner et al. | |
| 4,548,074 A | 10/1985 | Krueter | |
| 4,651,446 A | 3/1987 | Yukawa et al. | |
| 4,911,005 A | 3/1990 | Heyn et al. | |
| 5,008,775 A | 4/1991 | Schindler et al. | |
| 5,038,607 A | 8/1991 | Baer et al. | |
| 5,105,191 A | 4/1992 | Keedy | |
| 5,164,967 A | 11/1992 | Endo et al. | |
| 5,231,876 A | 8/1993 | Peet, II et al. | |

(Continued)

FOREIGN PATENT DOCUMENTS

GB 1238041 7/1971

(Continued)

*Primary Examiner*—Andre J Allen
(74) *Attorney, Agent, or Firm*—Edell, Shapiro & Finnan, LLC

(57) ABSTRACT

A speed measuring device with an output generating system is disclosed. The output generating system can generate visual outputs and/or audible outputs in response to a detected flow of air. The device includes a coupling component that allows the device to be wearable by a user.

31 Claims, 33 Drawing Sheets

U.S. PATENT DOCUMENTS

| | | | |
|---|---|---|---|
| 5,361,633 A | 11/1994 | Peet, II | |
| 5,446,775 A | 8/1995 | Wright et al. | |
| 5,487,311 A | 1/1996 | Guativa et al. | |
| 5,505,082 A | 4/1996 | Cushman et al. | |
| 5,526,290 A | 6/1996 | Kanzaki | |
| 5,710,380 A | 1/1998 | Talley et al. | |
| 5,721,539 A | 2/1998 | Goetzl | |
| 5,783,753 A | 7/1998 | Kellerman | |
| 5,899,963 A | 5/1999 | Hutchings | |
| 5,929,335 A | 7/1999 | Carter | |
| 5,939,645 A | 8/1999 | Kellerman | |
| 6,011,491 A | 1/2000 | Goetzl | |
| 6,013,007 A | 1/2000 | Root et al. | |
| 6,254,513 B1 | 7/2001 | Takenaka et al. | |
| 6,257,074 B1 | 7/2001 | Kellerman | |
| 6,314,793 B1 | 11/2001 | Webb et al. | |
| 6,356,856 B1 * | 3/2002 | Damen et al. | 702/160 |
| D461,421 S | 8/2002 | Kellerman et al. | |
| 6,428,449 B1 | 8/2002 | Apseloff | |
| 6,539,336 B1 * | 3/2003 | Vock et al. | 702/182 |
| 6,585,622 B1 | 7/2003 | Shum et al. | |
| 6,604,419 B2 | 8/2003 | Guzman | |
| 6,738,726 B2 | 5/2004 | Guzman | |
| 6,805,006 B2 * | 10/2004 | Guzman | 73/490 |
| 6,856,934 B2 * | 2/2005 | Vock et al. | 702/149 |
| 6,895,812 B2 | 5/2005 | Dahlberg | |
| 6,959,259 B2 | 10/2005 | Vock et al. | |
| 7,051,599 B2 | 5/2006 | Foss | |
| 7,162,392 B2 * | 1/2007 | Vock et al. | 702/182 |
| 2003/0163287 A1 | 8/2003 | Vock et al. | |
| 2005/0038626 A1 * | 2/2005 | Flentov et al. | 702/141 |
| 2005/0227811 A1 | 10/2005 | Shum et al. | |
| 2006/0015287 A1 * | 1/2006 | Vock et al. | 702/141 |
| 2006/0025282 A1 | 2/2006 | Redmann | |
| 2006/0064037 A1 | 3/2006 | Shalon et al. | |
| 2007/0260421 A1 * | 11/2007 | Berner et al. | 702/160 |
| 2008/0066560 A1 * | 3/2008 | Yu et al. | 73/861.85 |

FOREIGN PATENT DOCUMENTS

| | | |
|---|---|---|
| JP | 2005009973 | 1/2005 |
| JP | 2005308483 | 11/2005 |

* cited by examiner

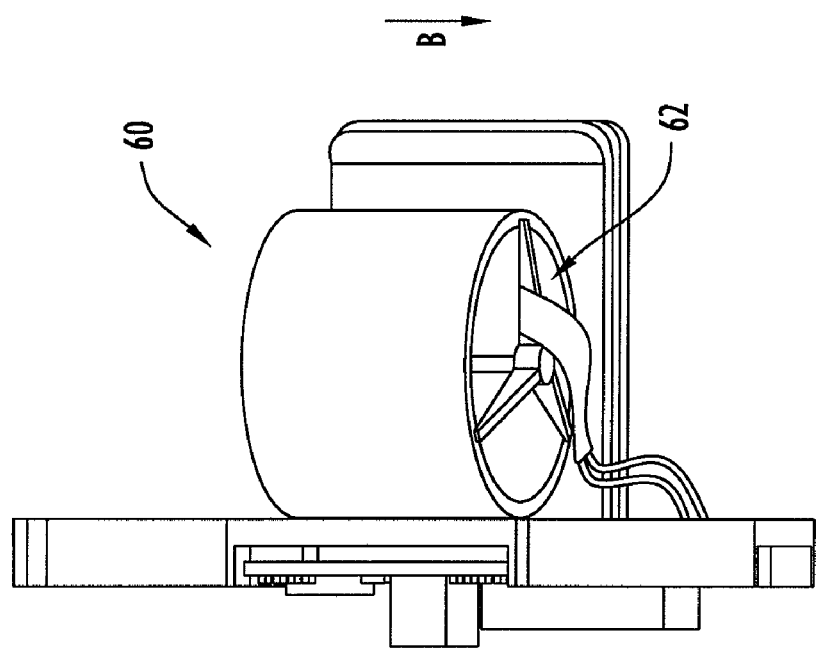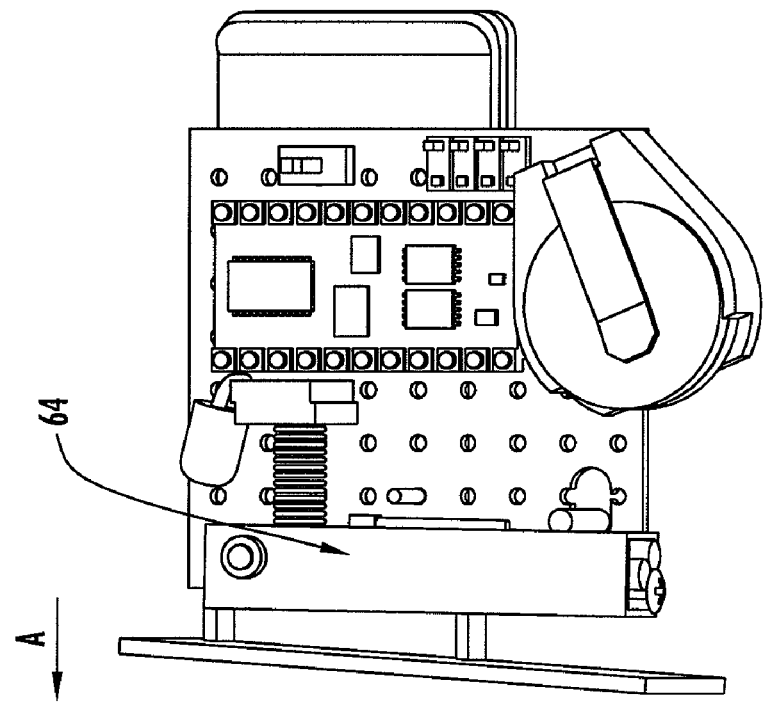
FIG.4

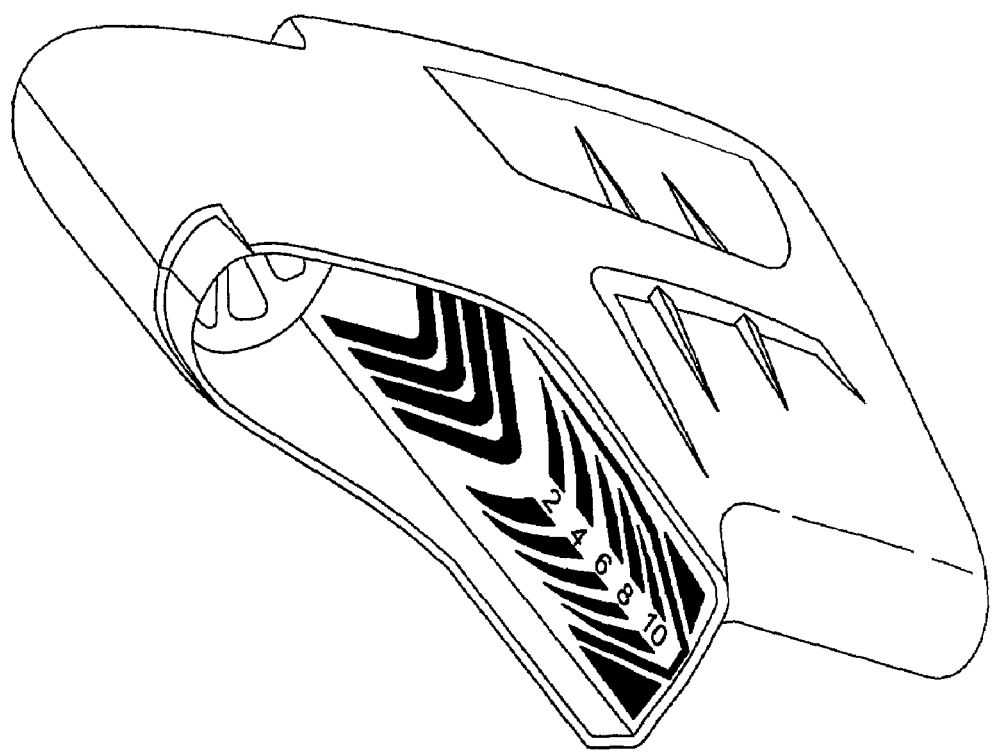
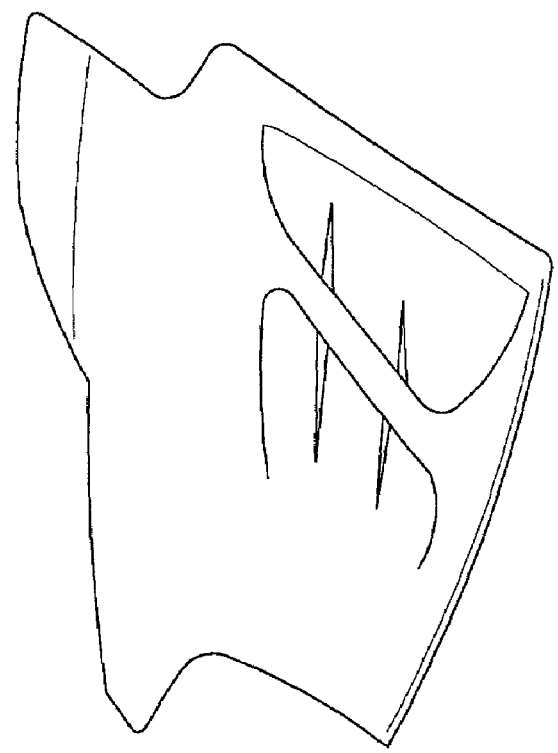
FIG. 19

ELECTRONIC DEVICE WITH SPEED MEASUREMENT AND OUTPUT GENERATION

CROSS-REFERENCE TO RELATED APPLICATION

This application claims the benefit of U.S. Provisional Application No. 60/846,009, entitled "Wearable Device Measuring Acceleration, Displacement, Inclination, and Speed With Visual Display" and filed on Sep. 19, 2006, the disclosure of which is hereby incorporated by reference in its entirety.

BACKGROUND OF THE INVENTION

This invention relates generally to an electronic device that generates visual and/or audible outputs in response to a measurement of speed. In particular, this invention relates to an electronic device with a component or system that can measure speed based on a flow of air, and produce an output relating to the measured speed.

SUMMARY OF THE INVENTION

The present disclosure relates to wearable devices having motion sensors that measure acceleration, displacement, inclination and/or speed in at least one axis. For example, a wearable device may have one or more of accelerometers, anemometers, and/or other motion sensors, such as jiggle switches, to measure acceleration, speed, inclination and/or displacement of a user in one or more axes. The user, while wearing or carrying the device, also may be able to read from a visual display a sensed motion, such as how high and fast he or she jumped as well as his or her horizontal speed and inclination. Results may also be read out to the user via a speaker on the device.

Examples of anemometers are disclosed in U.S. Pat. Nos. 5,783,753, 5,939,645, D461,421, U.S. Pat. Nos. 6,895,812, and 6,847,437. Examples of accelerometers are disclosed in Patent and Patent Application Publication Nos. EP977974, WO9944016, WO02093272, U.S. Pat. Nos. 6,805,006, 6,738,726, 6,604,419, 6,356,856, US 2003/0163287, U.S. Pat. Nos. 6,805,006, 6,738,726, 6,604,419, WO9858236, WO9854581, U.S. Pat. Nos. 6,959,259, 6,885,971, 6,539,336, 5,899,963, US2006/0015287, U.S. Pat. Nos. 7,092,846, 7,072,789, 6,959,259, 6,885,971, 6,375,572, 6,641,482, 6,200,219, US2004/0029640, U.S. Pat. Nos. 6,908,388, 5,602,566, US 2006/169044, US2006/155509, WO2006071708, U.S. Pat. No. 7,066,004, WO2006004908, WO2005121810, WO2005121987, WO2005118086, WO2005111960, US2005/242893, US2005/160816, US2005/139942, US2005/160814, US2005/202585, WO2005048645, WO2004092746, US2004/200281, WO2004088330, US2005132803, CN1673751, CN1664506, WO2004073138, US2004202344, SG114631, US2004/020292, WO03016919, US2003/036215, US2002/185699, US2002/174720, WO02103369, US2002/189355, US2002/188416, US2002/2077568, US2003/063045, WO0216150, U.S. Pat. No. 6,629,448, US2003/047002, EA2374, U.S. Pat. No. 4,967,605, and EU0401635. Examples of motion sensors are disclosed in Patent and Patent Application Publication Nos. US2006/0025282, US2006/0064037, US2005/0287502, US2005/0038680, US2002/0156351, US2001/0005772, US2004/0180708, US2005/0227811, U.S. Pat. No. 6,013,007, U.S. Pat. No. 4,651,446, U.S. Pat. No. 5,768,382, U.S. Pat. No. 6,585,622, US2005/0037844, U.S. Pat. No. 6,635,015, U.S. Pat. No. 6,428,449, U.S. Pat. No. 6,336,891, WO98/50121, WO2006/033104, WO2005/059487, WO02/085140, and WO01/87152. The disclosures of all of the patents, patent applications, and publications recited herein are incorporated herein by reference.

The advantages of the present invention will be understood more readily after a consideration of the drawings and the Detailed Description.

BRIEF DESCRIPTION OF THE DRAWINGS

FIG. 4 is a perspective view of exemplary wearable devices having, respectively, a jiggle switch and a propeller.

FIG. 19 illustrates a prototype of an exemplary wearable device having the propeller.

DETAILED DESCRIPTION

Figure 1:
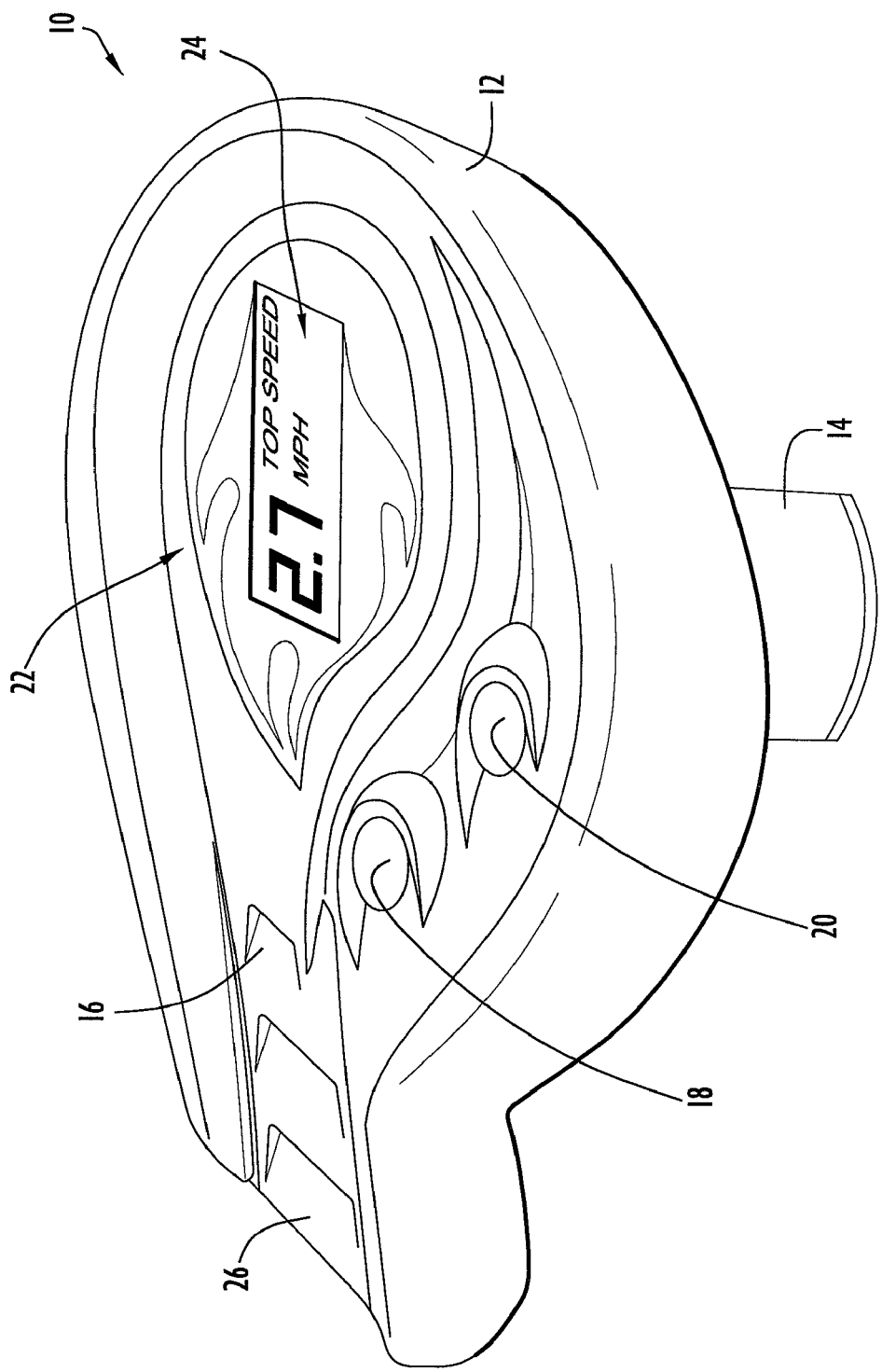
FIG. 1 is a perspective view of a prototype of an exemplary wearable device measuring acceleration, displacement, inclination and/or speed which may be selectively displayed on a visual display.

Children may find a device that is capable of telling them how high they jump and how fast they go to be particularly enjoyable. Additionally, children may enjoy a device that tells them their inclination or tilt relative to the earth as they race around corners or do tricks in the air while running, skateboarding, snowboarding or other such activities. FIG. 1 illustrates a wearable device 10 measuring one or more types or directions of motion, such as acceleration, displacement, inclination and/or speed with a visual display that may be made small in size, sufficiently light in weight to be worn on a wrist, belt or foot. Wearable device 10 may accordingly include a housing 12 having a clip 14 adapted to clip the wearable device onto any object selected by the user, such as a shoe, belt, watch band, or even an object carried or used by the user, such as a bat, racket or bicycle. The wearable device 10 may include an information system 16 supported in housing 12, with input devices 18, such as keys 20 for manually controlling operation of the information system, and output devices 22, including an alphanumeric display 24 and a speaker 26.

Figure 2:
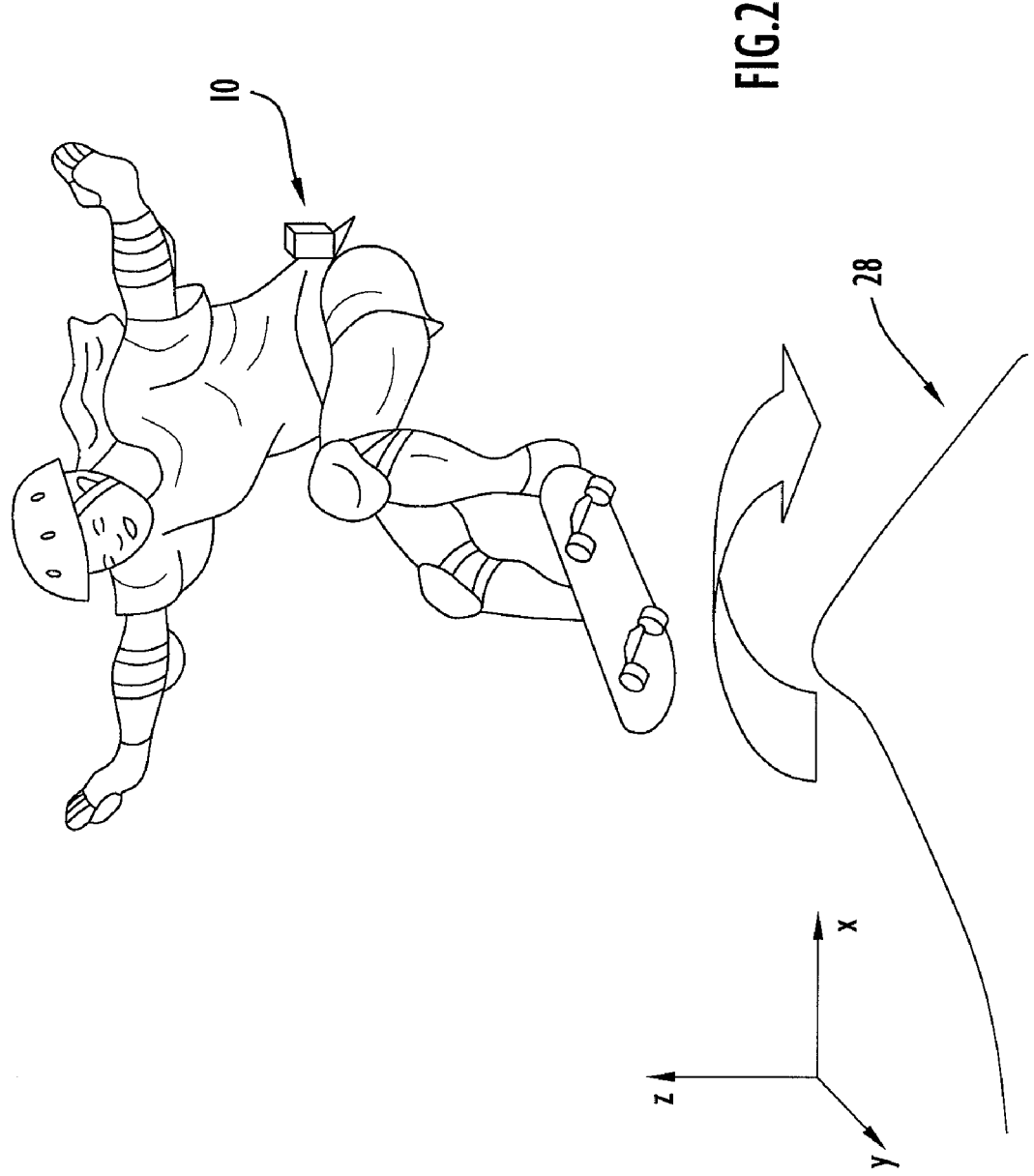
FIG. 2 is an illustration of a user using the wearable device of FIG. 1.

FIG. 2 illustrates a person wearing the wearable device 10 on her belt or an article of clothing while performing skateboarding stunts, such as jumping off of a ramp 28. As depicted, the wearable device 10 may measure movement along one or more axes, such as movement along the ground in a first or "X" direction, and may measure travel vertically from the ground, or in the "Z" direction. Additionally, the wearable device 10 may measure lateral motion, such as inclination or tilt in a third or "Y" direction.

Figure 3:
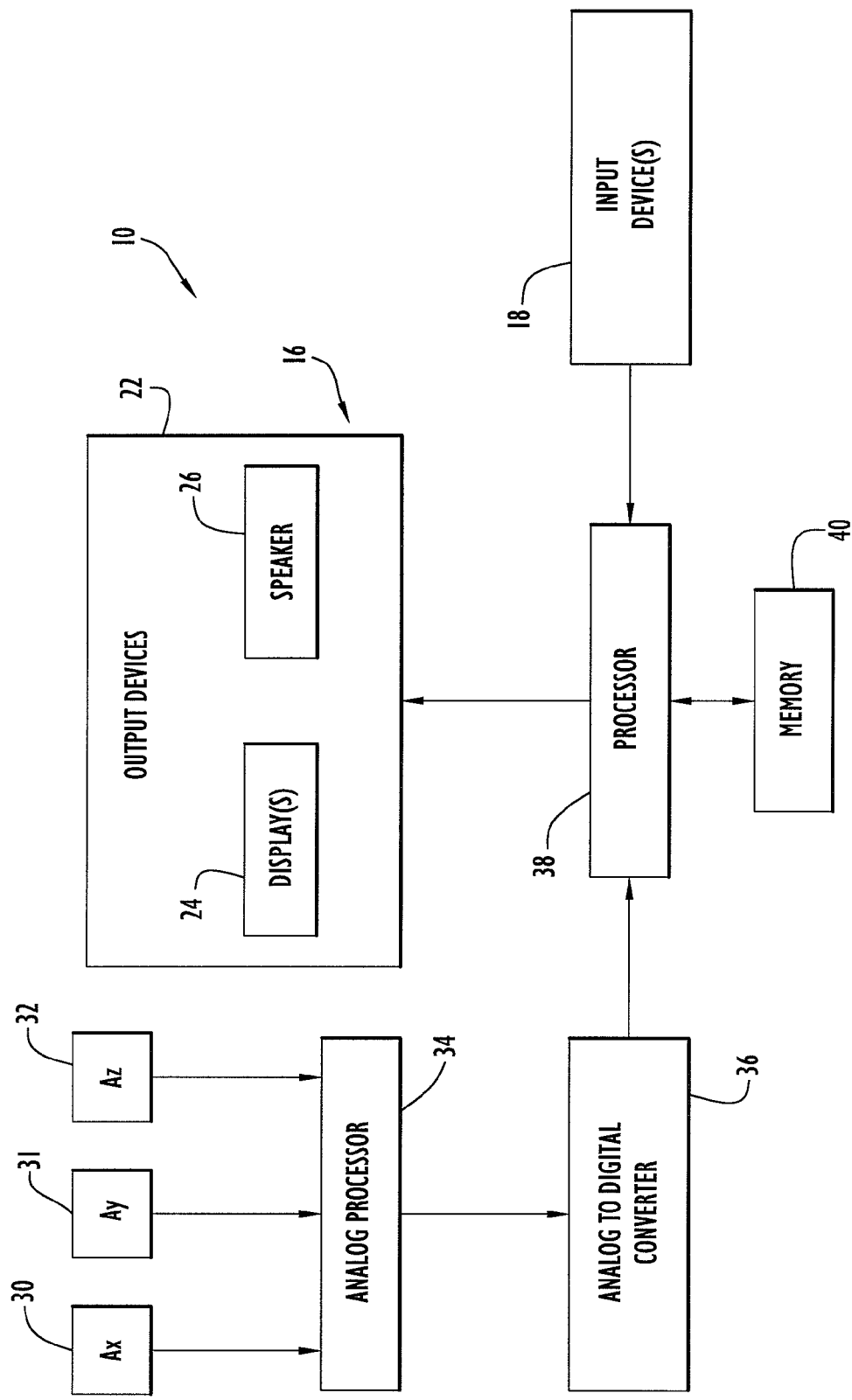
FIG. 3 is a block diagram of the wearable device having motion sensors along three axes.
Figure 5:
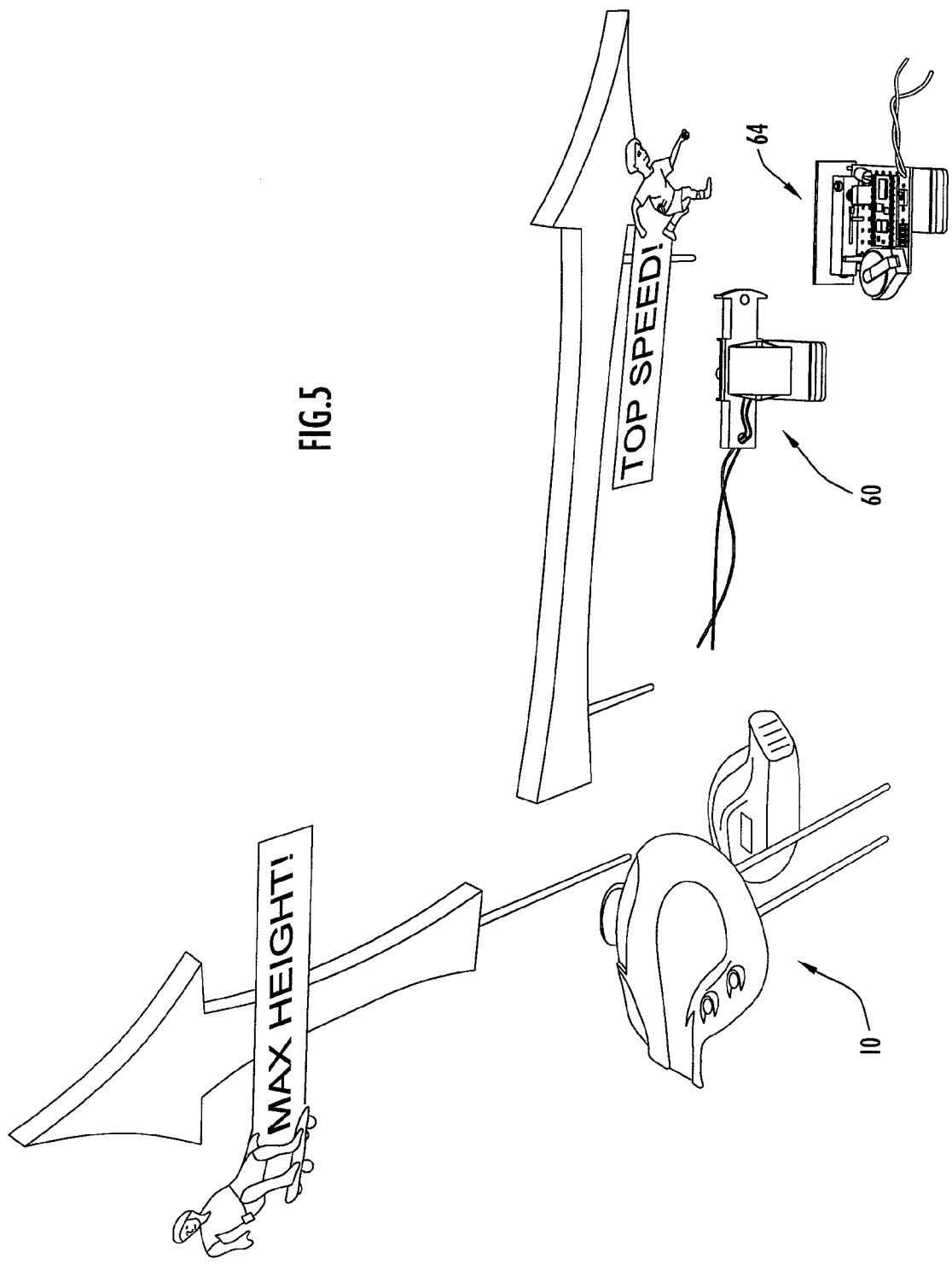
FIG. 5 illustrates an exemplary wearable device next to embodiments having a jiggle switch and a propeller.
Figure 6:
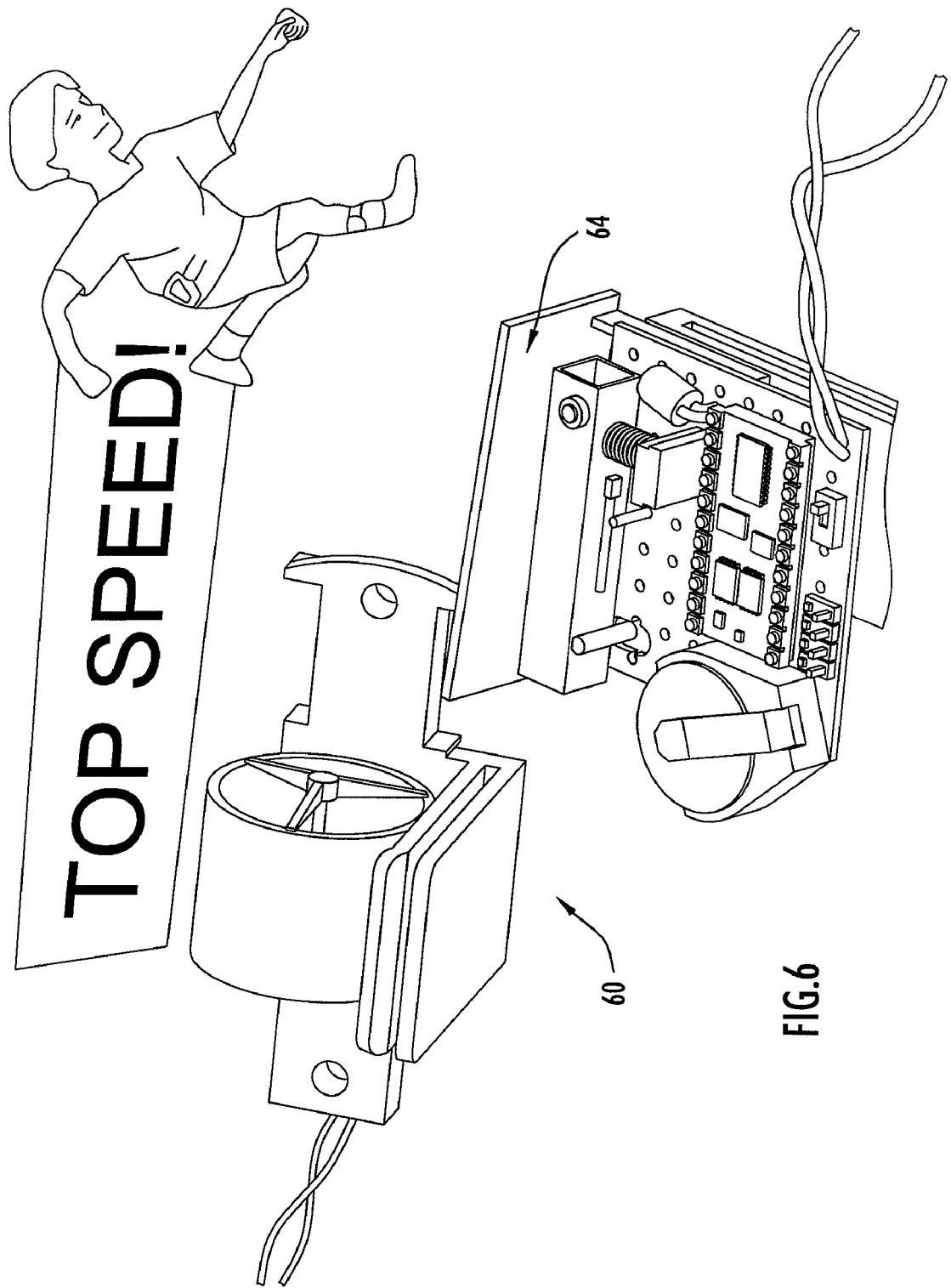
FIGS. 6-8 are various views of the components of the wearable device having a jiggle switch and a propeller.
Figure 7:
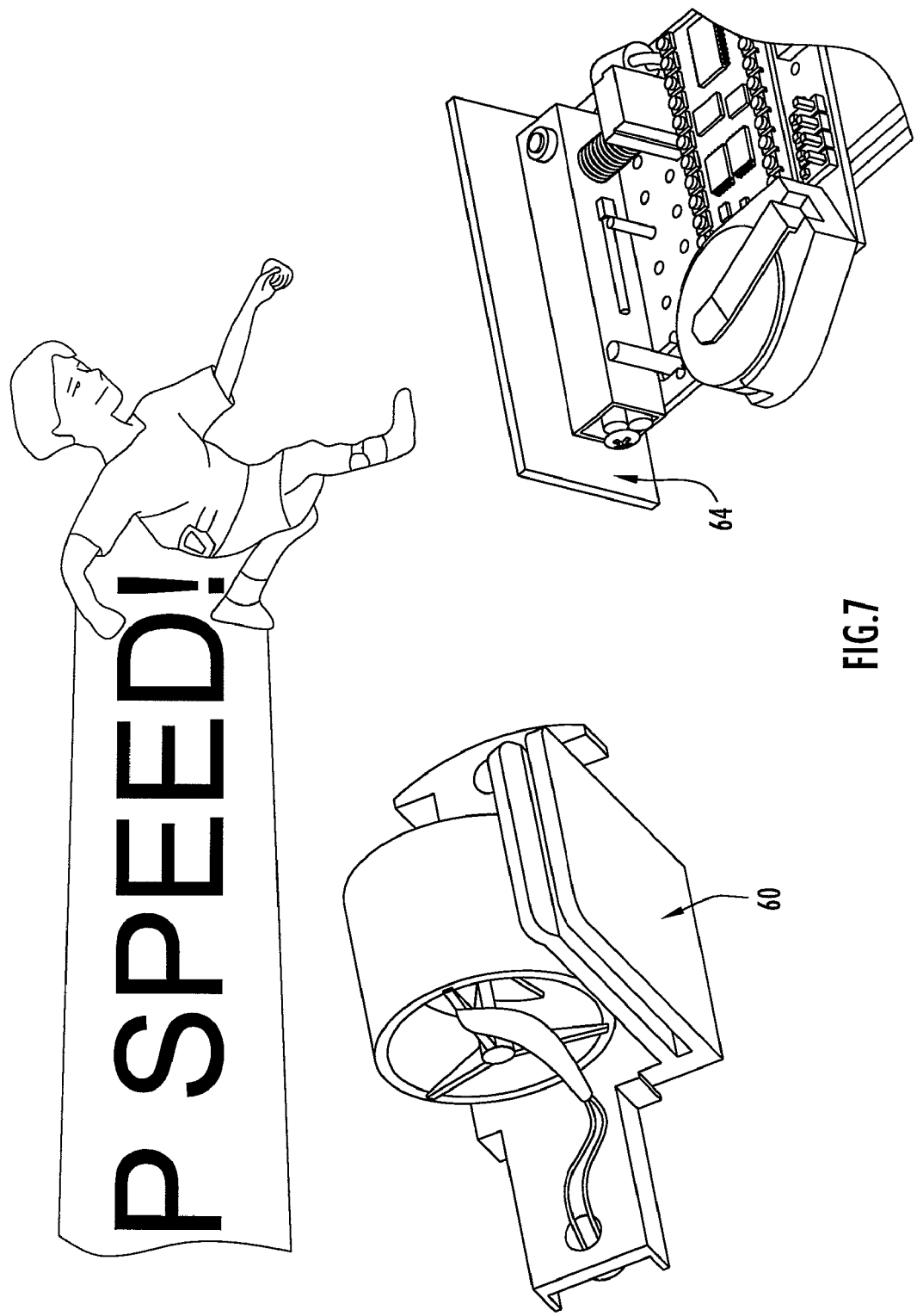
Figure 8:
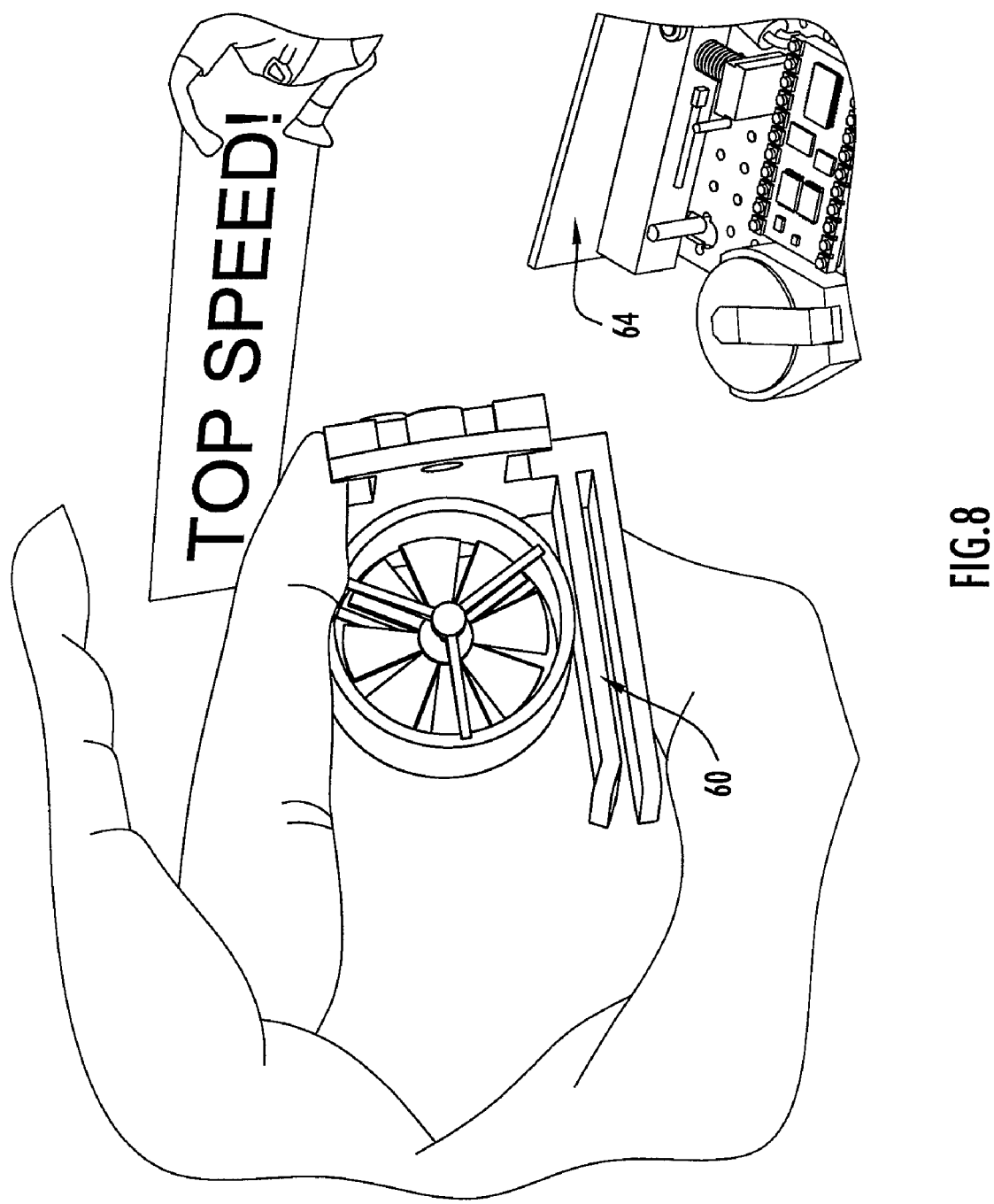
Figure 9:
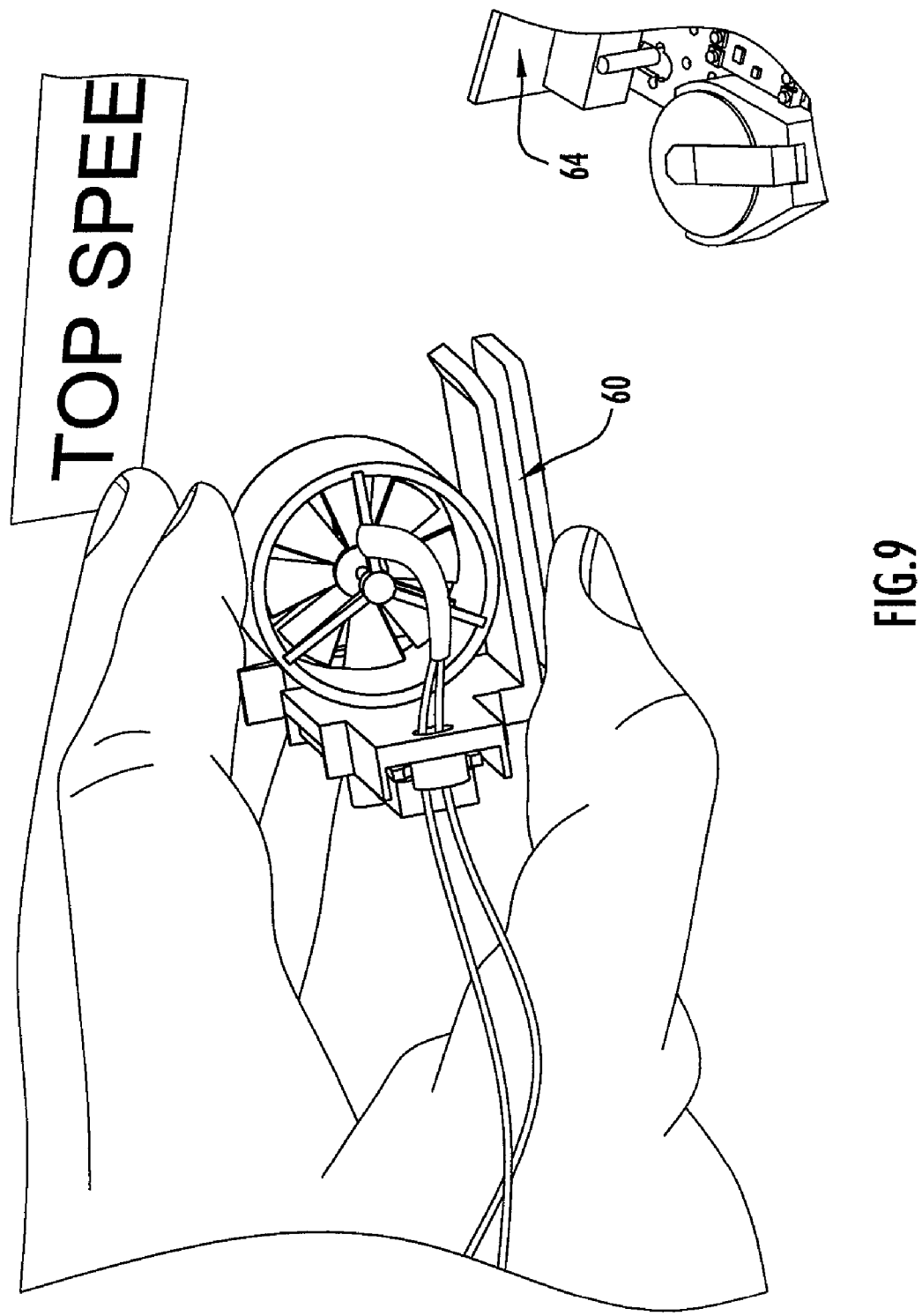
FIGS. 9-12 are various views of the wearable device having the propeller.
Figure 10:
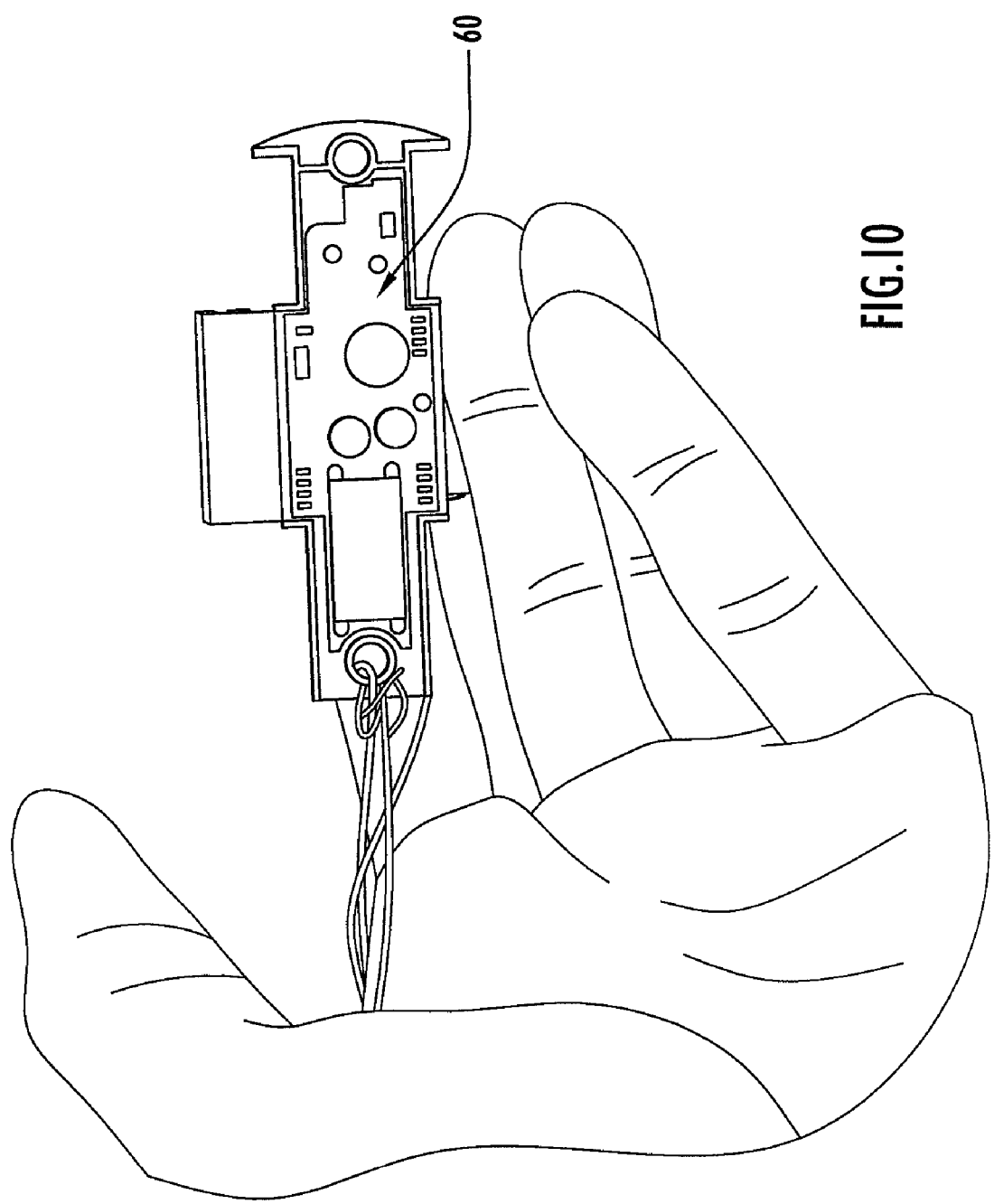
Figure 11:
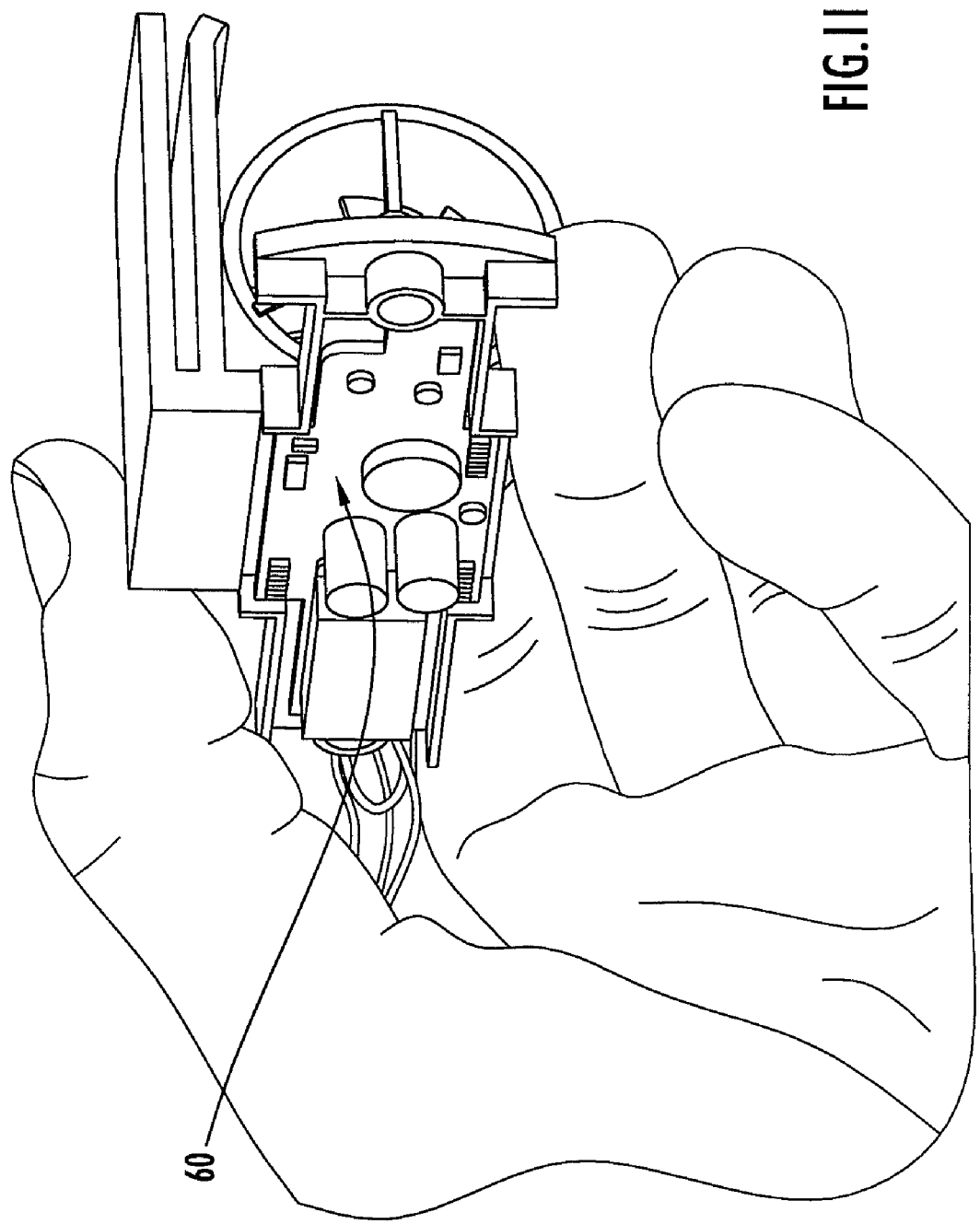
Figure 12:
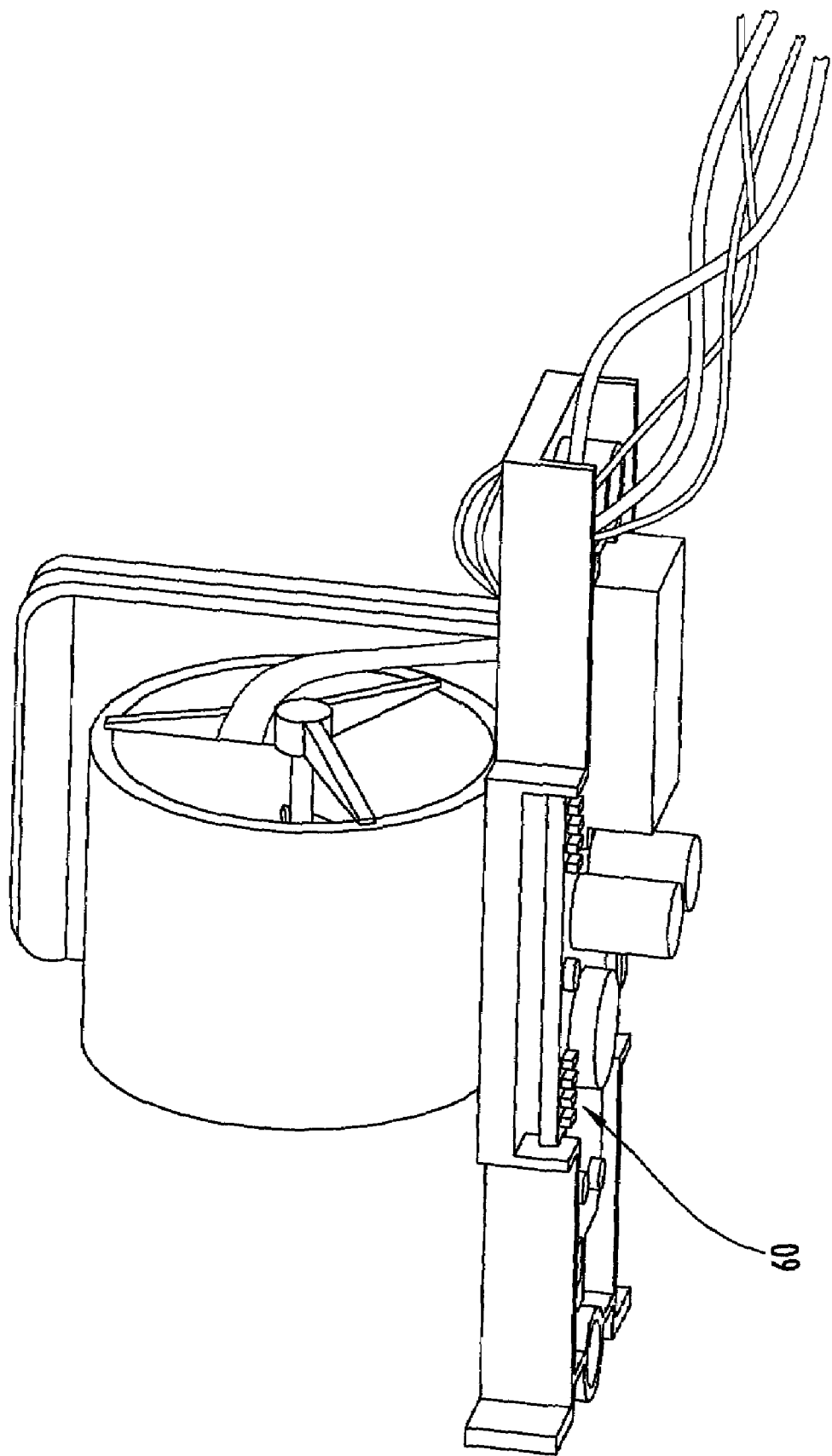
Figure 13:
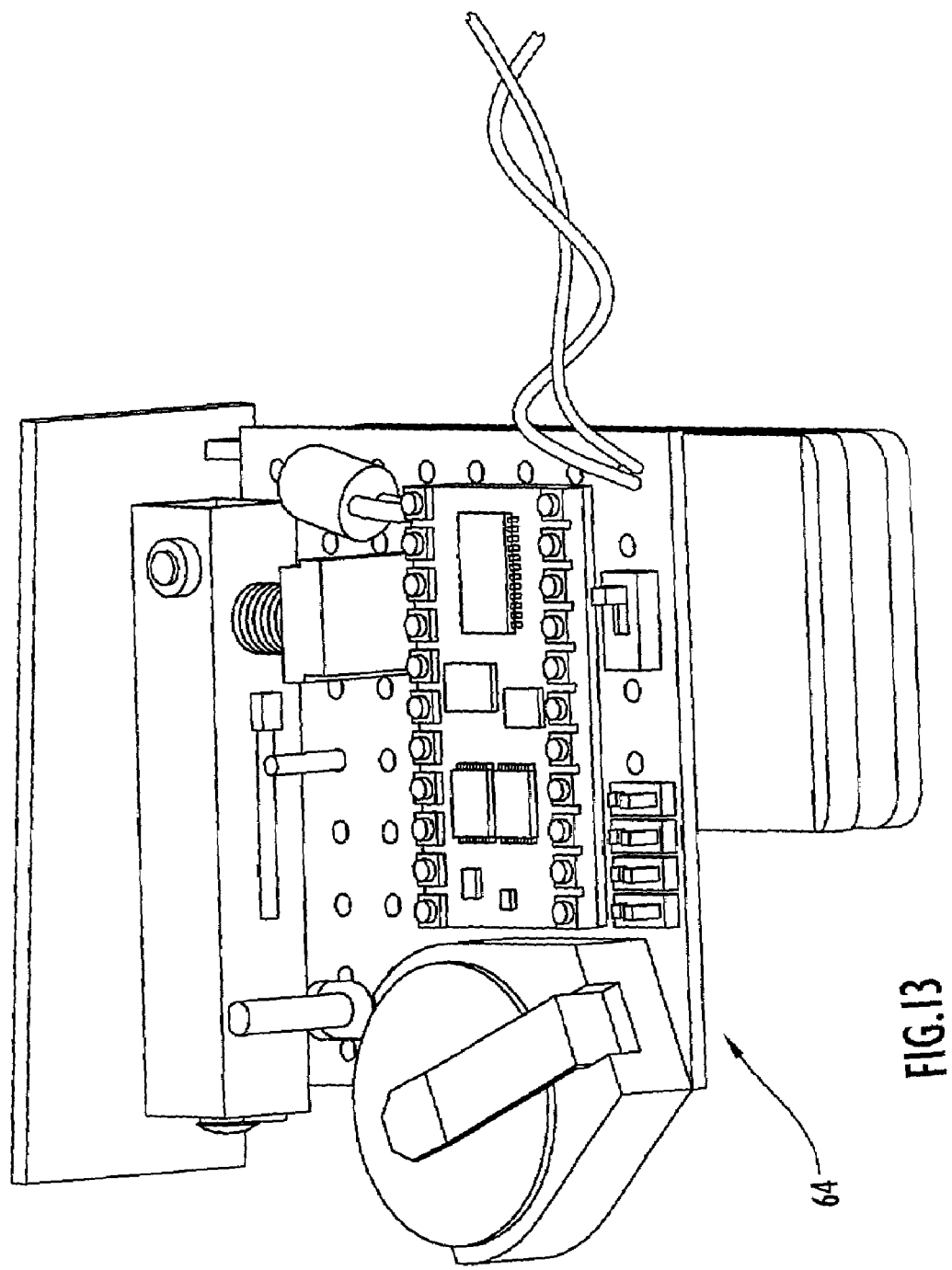
FIGS. 13-18 are various views of wearable device the having a jiggle switch.

Referring now to FIG. 3, a wearable device 10 may include one or more motion sensors. In this example device 10 includes an X-axis motion sensor 30, a Y-axis motion sensor 31, and a Z-axis motion sensor 32. Sensors 30, 31 and 32 may have outputs coupled to an analog processor 34 that inputs the analog signals from the sensors to an analog-to-digital converter 36. The converter then inputs a digital signal representative of the analog signals into a processor 38. The processor processes the motion information from the sensors, storing the data in a memory 40. Memory also may store instructions for operating the processor as well as other permanently or temporarily stored data. Instantaneous and average values may be produced.

The wearable device 10 may use a single motion sensor or a combination of motion sensors to measure acceleration, displacement, inclination, and speed. In one embodiment, one or more accelerometers may be used to measure characteristics of travel along one or more different axes. An example of a commercially available dualaxis accelerometer that may be used in device 10 is a 1.5 g Dual Axis Micromachined Accelerometer available from Freescale Semiconductor, Inc. of Chandler, Ariz. An example of a commercially available 3-axis accelerometer is the SCA3000 Series 3-axis accelerometer available from VTI Technologies, Inc. of Dearborn, Mich. Single-axis accelerometers may also be used. Embodiments of the wearable device 10 that include a 3-axis accelerometer may detect movement as well as positioning against gravity force. For example, when rotated along the X, Y, Z axes, the 3-axis accelerometer may produce an output such that the position of the sensor with respect to the earth is definable. Speed can be determined by integrating the acceleration data, and distance can be determined by an integration of the speed. Two and three dimensional sensing may thus be useful for motions that are not restricted to motion along a single axis, such as jumping while running or doing flips or turns while jumping, skating, biking or boarding.

A further embodiment of the wearable device 10 may have other types of motion sensors such as an anemometer, a jiggle switch or a sonic sensor. The wearable device may have an anemometer alone or in combination with an accelerometer or other motion sensor. For example, FIGS. 4-7 show an anemometer 60 in combination with a jiggle switch 64. The jiggle switch 64 is exemplary of a device that can measure height. The anemometer 60 is exemplary of a device that can be used to measure speed. In FIG. 4, the "A" arrow designates an upward direction and the "B" arrow designates a forward direction. FIGS. 8-12 show various views of an exemplary propeller anemometer 60. FIG. 19 shows a prototype of an exemplary wearable device having a propeller 62 to measure speed. Movement of the wearable device, such as when the user is running, causes the propeller 62 to rotate. Speed may be measured based on air flow through a propeller 62 and may be proportional to the rate of rotation of the propeller 62. The rate of rotation of the propeller 62 is converted into speed of travel. The rotation of the propeller 62 may be transduced into an electrical signal using an appropriate rotation detector. For example, an IR beam that shines through the blades with the spinning blades interrupting the beam may be detected to produce a signal related to the rate of rotation. A second possible mode of transduction may be the use of a magnet on each propeller blade or vane, or a magnet attached to a rotating shaft that supports the blades that moves past a fixed magnet.

Figure 14:
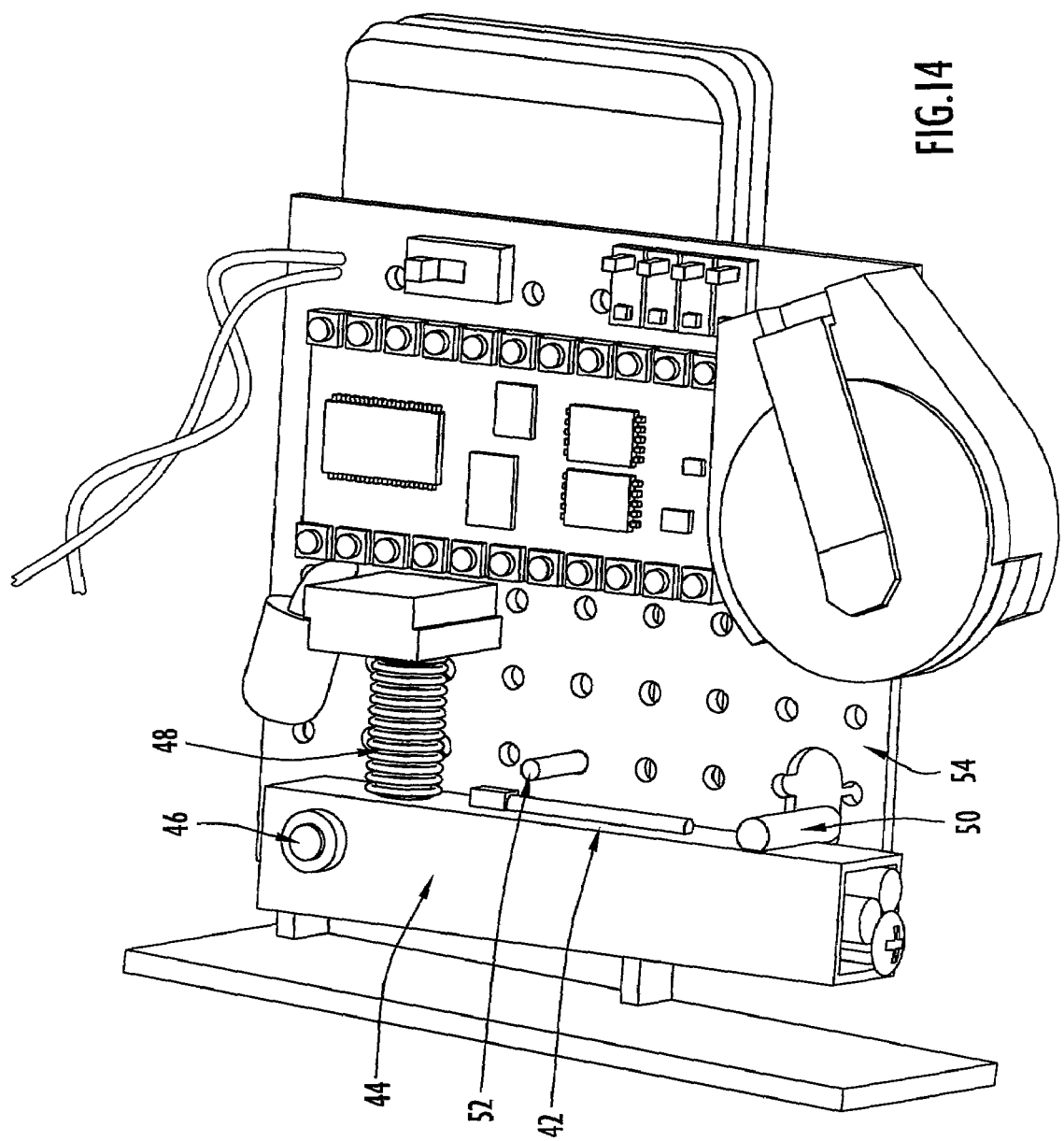
Figure 15:
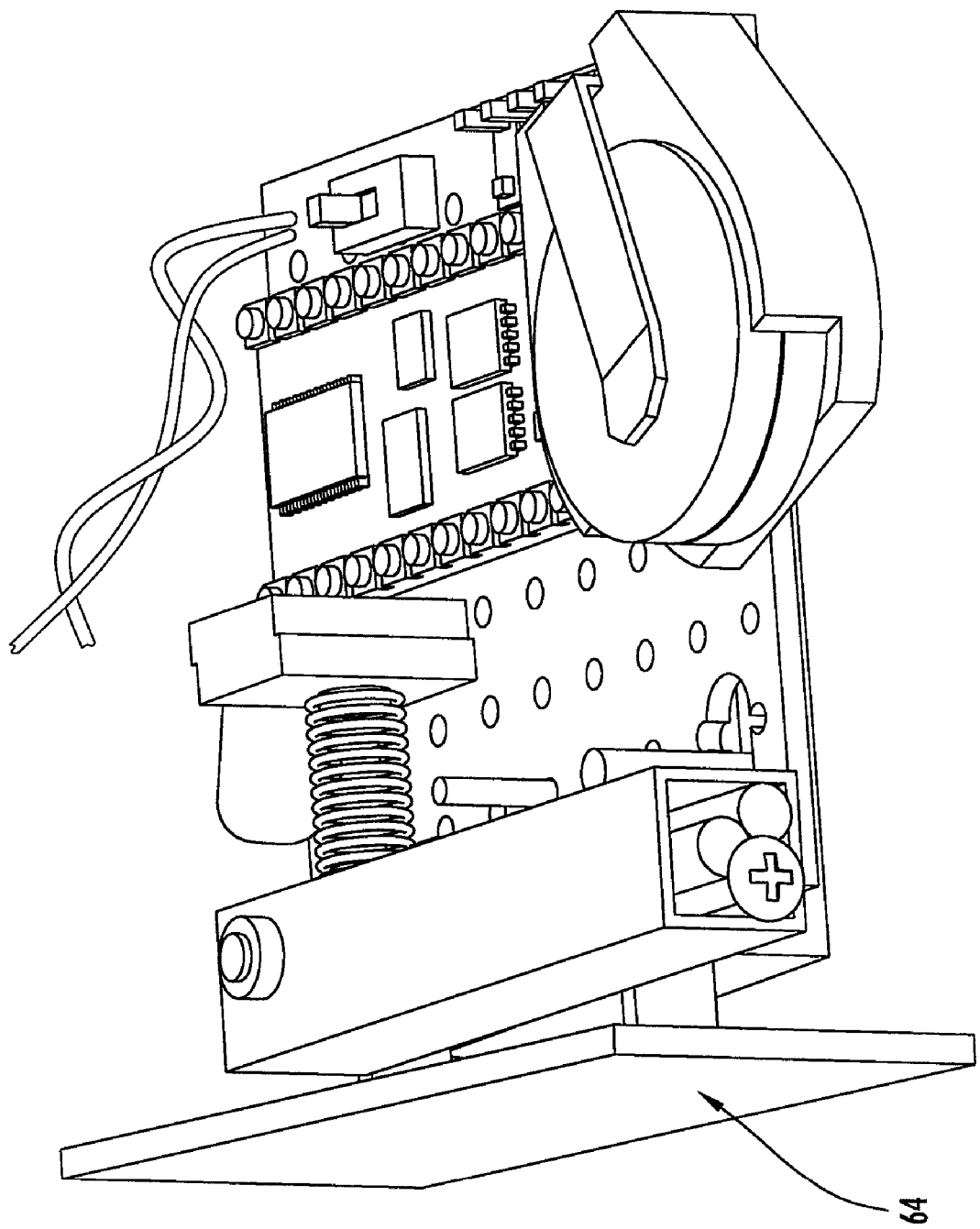
Figure 16:
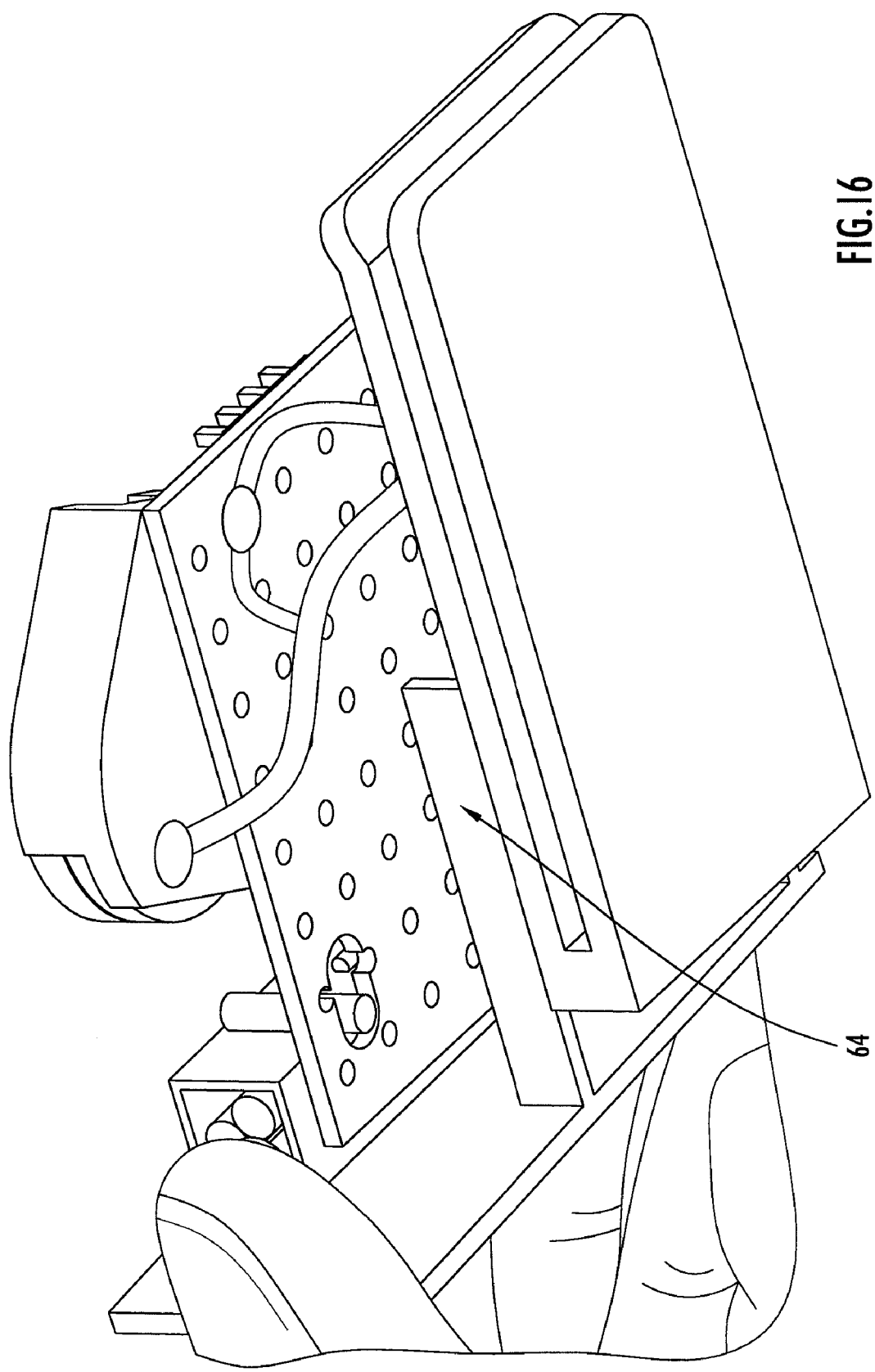
Figure 17:
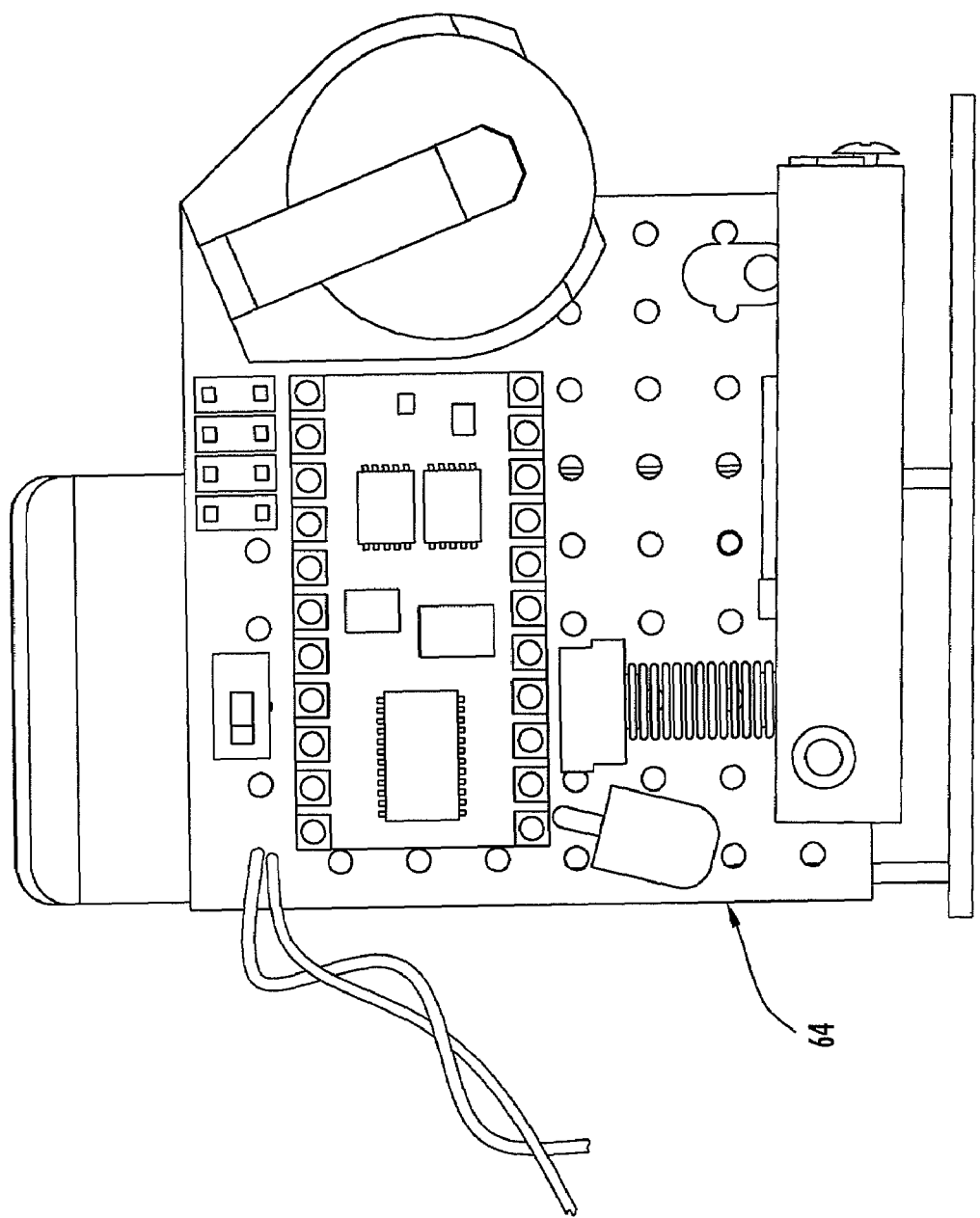
Figure 18:
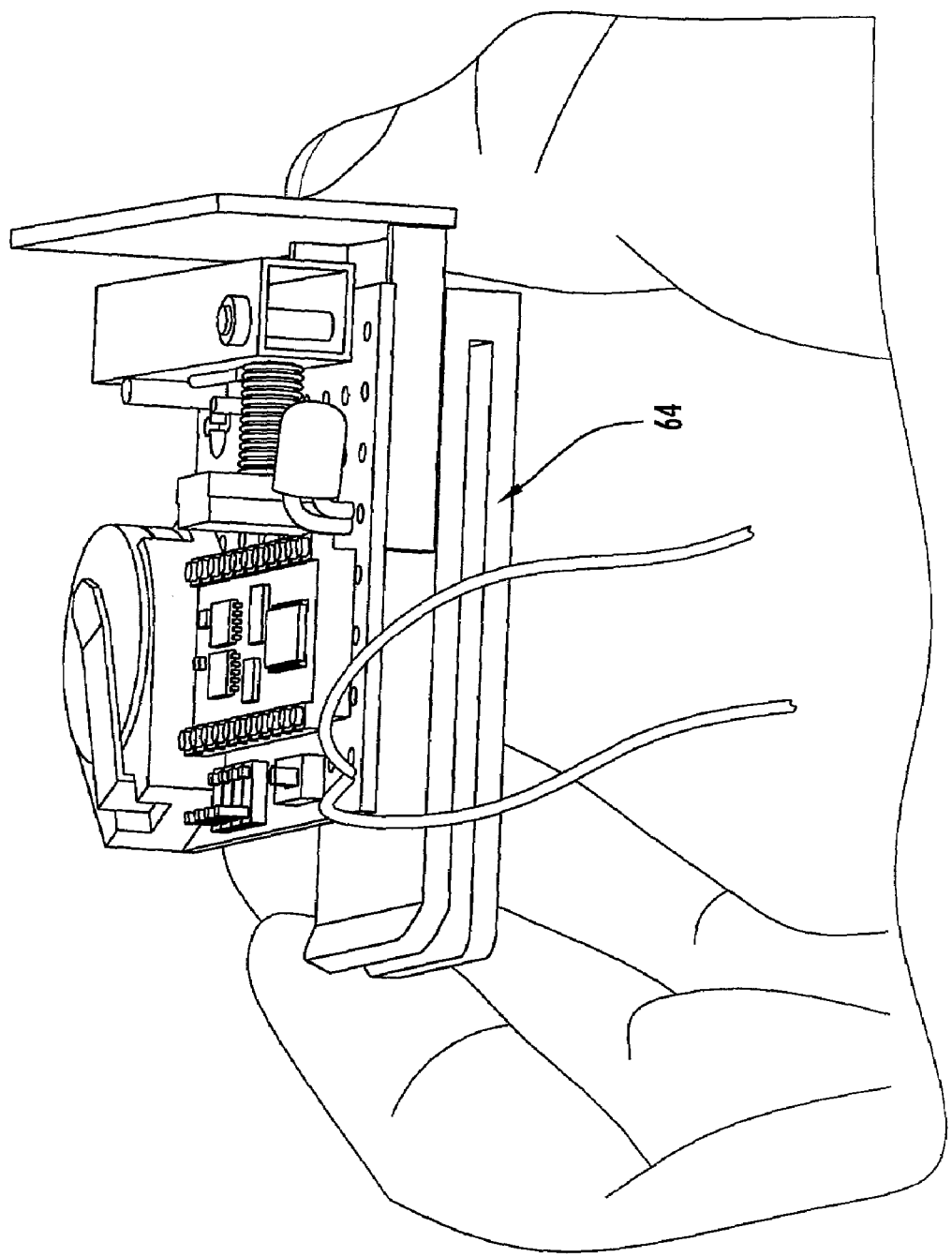

In yet a further embodiment, the wearable device 10 may have a motion sensor in the form of a jiggle switch. The wearable device may have a jiggle switch alone or in combination with an accelerometer, an anemometer, or other device. A motion-sensing device with an exemplary jiggle switch is shown in association with the motion-sensing device having an anemometer in FIGS. 4-7 and alone in FIGS. 13-18. Referring to FIG. 14, the jiggle switch circuit may be active when a circuit contact 42 is in contact with a contact member 52. The circuit contact 42 may be mounted to a pivotable member 44 and the contact member 52 may be mounted to a stationary platform 54. During impact, for example when the user jumps, the pivotable platform 44 is pivotable about pivot point 46 and thus able to open and close contact between circuit contact 42 and contact member 52. Vertical height may be determined based upon the duration of "flight" from start of jump to landing based upon time duration between successive activations of a jiggle switch and the use of look-up tables that translate time into height. The motion of the pivotable member 44 is further controlled by a resilient spring 48 and a guide post 50. Spring 48 may bias platform 44 and contact 42 away from contact member 52. In additional embodiments, other sensors, such as ultra sonic sensors, may be used to measure height jumped or distance from an object.

Referring again to FIG. 3, input devices 18 may be used to input information into the processor, such as user-specific information, depending on the characteristics of the keys provided. Input information may be based on menus displayed on display 24 or may be provided by a more extensive keyboard, such as an alphanumeric keyboard, not shown. Output during an activity or following completion of an activity may then be provided to the user by way of output devices 22. In particular, the current speed, inclination, or a highest recent height may be output with a spoken voice on speaker 26. Alphanumeric information may be displayed on a display 24.

It is thus appreciated that wearable device 10 may be worn on the belt or other position on a person or object, to obtain measurement of both speed and vertical height jumped. These calculations may be performed using the two axis or three axis acceleration sensors (that measure acceleration at any given point). In alternative embodiments these calculations may be preformed using one or more motion sensors such as an anemometer, and/or a jiggle switch or other motion sensor in place of or in addition to one or more accelerometers shown in FIG. 3. Readings may be provided for both forward and backward speed and height displacement.

During use, wearable device 10 may be worn on the user or an object used by the user. When worn, the user can measure her or his speed, inclination, and jumping height by placing the wearable device on a foot or on any vehicle of his or her choice. The computed information may be output in a fun toyetic (sound chip) way as to encourage the user to beat his or her previous record. Outputs may be provided by one or both of a digital readout as well as in the form of sound (spoken information). In summary, then, the wearable device may, for example, be capable of giving speed, inclination, acceleration and/or height feedback, plus keeping track of new records.

Figure 20:
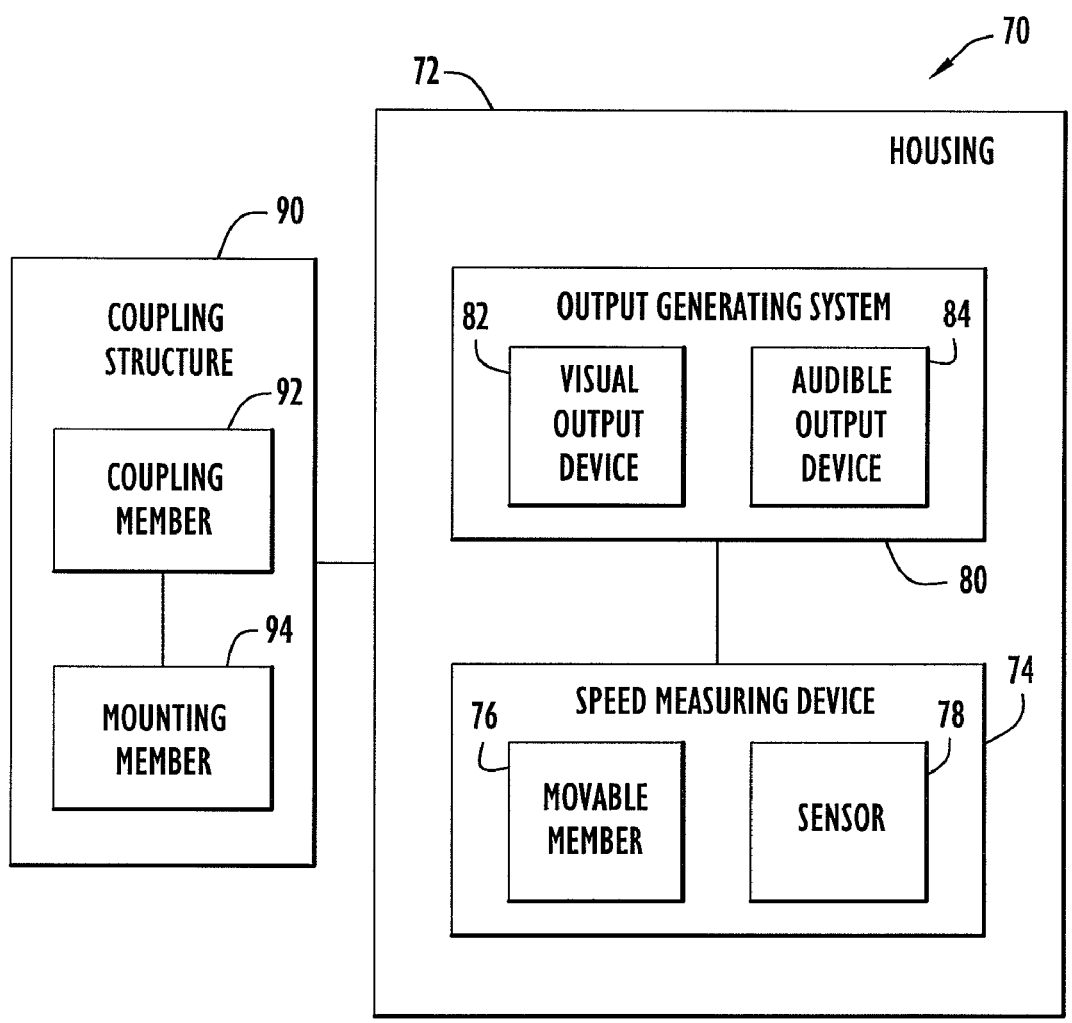
FIG. 20 is a schematic block diagram of an embodiment of an electronic device according to the present invention.

An embodiment of an electronic device that is configured to generate an output in response to the flow of air relative to the device is illustrated in FIG. 20, which is a schematic block diagram. In this embodiment, the electronic device 70 includes a housing 72 in which or to which the various components are coupled or located. The housing 72 includes a speed measuring device 74. The speed measuring device 74 can measure the movement and relative speed of the device 70. The speed measuring device 74 is configured to allow air to flow therethrough. The flow of air engages a movable member 76 and causes it to move. The speed measuring device 74 includes a sensor 78 that can determine the movement of the movable member 76. For example, the movable member 76 can be a rotatably mounted propeller or impeller. As the housing 72 moves, air flows into the speed measuring device 74 and engages the propeller, which then rotates. In this example, the sensor 78 is configured to calculate how fast the propeller is rotating. The rate of rotation of the propeller is converted into a speed of travel. As the propeller rotates faster, it is indicative of an increased speed of air flowing relative to the device 70 which translates to the housing 72, and a user, moving faster as well.

In one embodiment, the sensor 78 can be an infrared sensor that generates a beam that is broken or interrupted by the blades of the propeller thus creating pulses of light that are received by a sensor. The frequency at which the beam is interrupted is indicative of the air flow speed. In another embodiment, the sensor 78 can be a Hall Effect sensor that cooperates with a magnet on the propeller. The Hall Effect sensor senses how often a magnet on a vane or portion of the propeller passes the Hall Effect device. The speed measuring device can be referred to alternatively as an air flow device, an air flow instrument, or other similar terms. The electronic device can be referred to alternatively as an output generating device or generally as a speed measuring device.

The electronic device 70 includes an output generating system 80 that is configured to generate and produce various outputs. The output generating system 80 is operably connected to the speed measuring device 74 such that information from the speed measuring device 74 results in different outputs being generated. In one embodiment, the output generating system 80 includes a visual output device 82 and an audio output device 84. The visual output device 82 can be a display, such as an LCD screen, that is configured to generate visual outputs such as images or elements. The elements can resemble speed bars and form a bar graph. The audible output device 84 can be a speaker that is configured to generate audible outputs such as sound effects, including sound effects similar to the revving or running of a car engine.

In this embodiment, the housing 72 has a coupling structure 90 connected thereto. The coupling structure 90 is configured to enable a user to mount or attach the housing 72 to an object so that it is supported. The object can be a user, an article of clothing or accessory worn or carry by the user, or another object separate from the user. The coupling structure 90 includes a coupling member 92 that is configured to support the housing 72. In addition, the coupling structure 90 includes a mounting member 94 that can be releasably or fixedly connected to the housing 72 or coupling structure 90. The mounting member 94 is configured to be secured to an object. Exemplary embodiments of a coupling member 92 and a mounting member 94 are described in detail below. These members 92 and 94 enable a user to use the electronic device 70 in various locations and in various manners, thereby rendering the device 70 portable and wearable. The device can be used to measure the speed of kids running or on a bike, skateboard, etc. The mounting member 94 can be used to mount the device to a bicycle handlebar.

Figure 21:
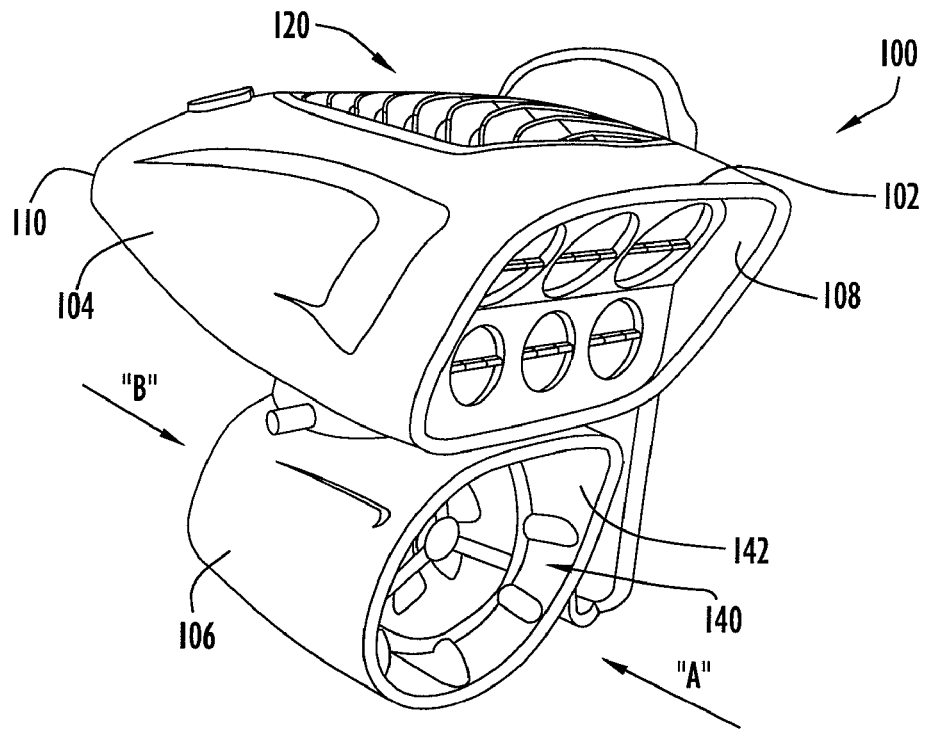
FIG. 21 is a front perspective view of an embodiment of an electronic device according to the present invention.

An embodiment of an electronic device according to the present invention is illustrated in FIGS. 21-37. In this embodiment, the electronic device 100 includes a housing or body 102 with an upper portion 104, a lower portion 106, a front end 108, and an opposite, rear end 110. Referring to FIG. 21, the lower portion 106 includes a channel 142 in which a speed measuring device 140 is located. The channel 142 is configured so that air can flow through the lower portion 106 along the direction of arrow "A" from the front 108 to the rear 110 of the device 100. The channel 142 is also configured so that air can flow in an opposite direction along arrow "B" as shown. Air flowing into the channel 142 engages the speed measuring device 140 as described in detail below. The electronic device 100 includes an output generating system 120 that is configured to generate various outputs based on the flow of air that is measured by the speed measuring device 140.

Figure 22:
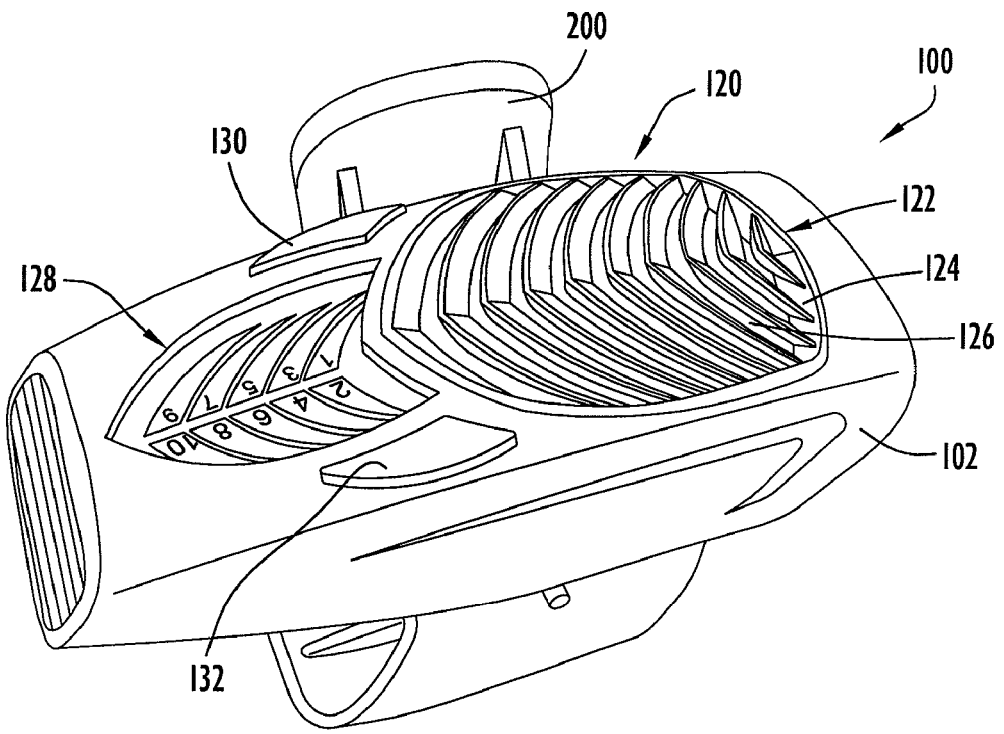
FIG. 22 is a top perspective view of the electronic device illustrated in FIG. 21.

Referring to FIGS. 22-30, several different views of this embodiment of the electronic device 100 are illustrated. In FIG. 22, which is a top perspective view of device 100, some of the components of the output generating system 120 of the device 100 are shown. The output generating system 120 includes an audible output device 122, such as a speaker, that can be used to generate and produce audible outputs such as sound effects. A speaker plate 124 with openings 126 can be provided in an opening of the body 102. The output generating system 120 also includes a visual output device 128, such as an LCD screen, that can be used to generate and produce visual outputs. The device 100 has an internal electronic system that includes a conventional controller and memory unit that are connected to the speaker 122 and the screen 128. The output generating system 120 also includes buttons 130 and 132 that can be actuated by a user to change the outputs of the device 100. The electronic device 100 also includes a coupling structure 200 that is used to couple or attach the device 100 to an object.

Figure 23:
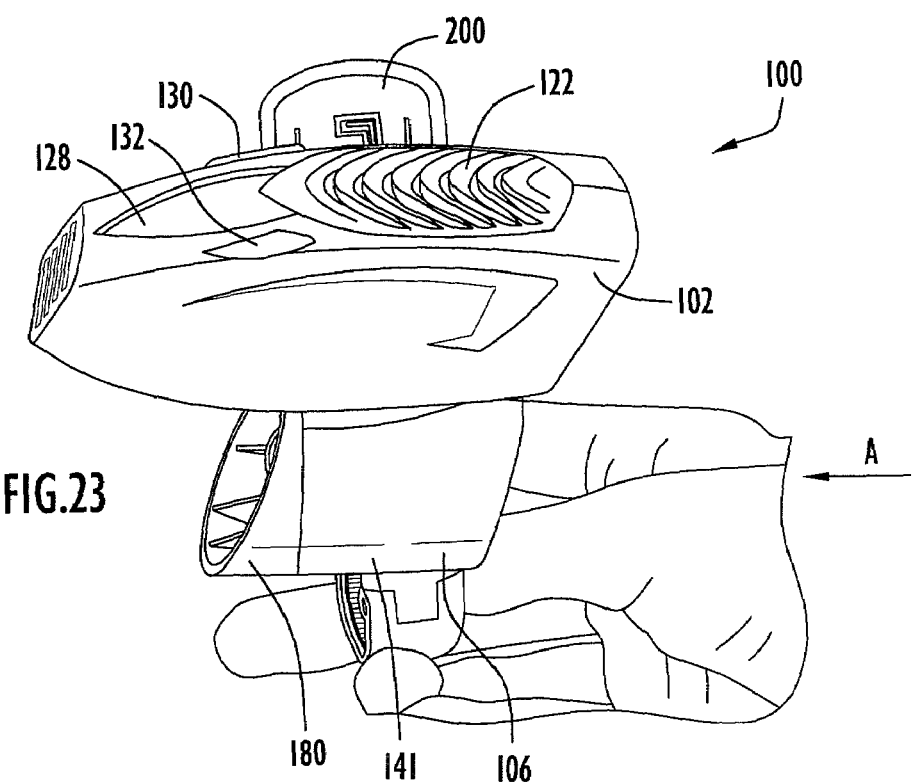
FIG. 23 is a side view of the electronic device illustrated in FIG. 21.

Referring to FIG. 23, a side view of the electronic device 100 is illustrated. In this embodiment, the lower portion 106 includes a main portion 141 and a rear portion 180 that is removably coupled to the main portion 141 as discussed in detail below.

Figure 24:
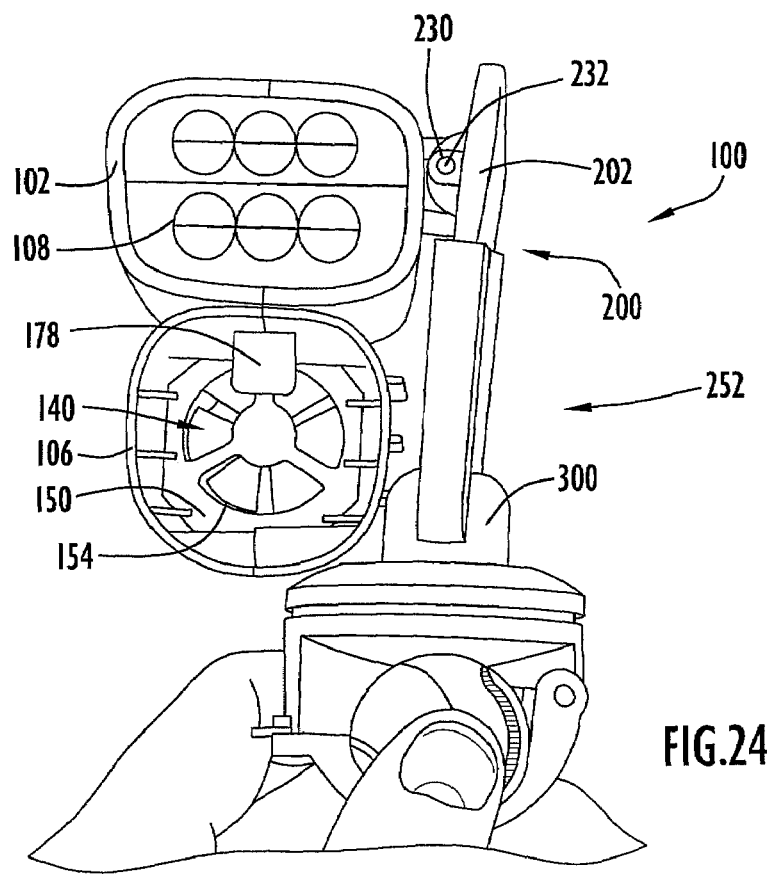
FIG. 24 is a front view of the electronic device illustrated in FIG. 21.

Referring to FIG. 24, a front view of the electronic device 100 is illustrated. The electronic device 100 includes a coupling component 200 that is movably coupled to the body 102. In this embodiment, coupling component 200 is pivotally mounted to the body 102 and together with the body 102 forms a clamping mechanism that allows a user to mount the electronic device 100 on an article such as a strap or belt. The coupling component 200 is pivotally mounted by a connector 230 and rotatable about an axis 232 defined by connector 230 as shown in FIG. 24. The coupling component 200 can be moved between a clamping configuration 252 (see FIG. 24) and a receiving configuration 250 (see FIG. 32). In the receiving configuration 250, the coupling component 200 is spaced apart from the body 110 so that an article can be inserted therebetween. When the coupling component 200 is released by the user, it returns to its clamping configuration 252 and is secured to the inserted article.

The electronic device 100 also includes a mounting portion 300 that enables the device 100 to be secured to an article or object, such as a rod or pole or bar. In this embodiment, the mounting portion 300 is removably coupled to the coupling portion 202 as described below.

Referring to FIG. 24, some of the components of the speed measuring device 140 are illustrated. In particular, the device 140 contains a front housing portion 150 (best seen in FIG. 34) that includes several openings 154 through which air can flow. The lower portion 106 also includes a light blocking member 178, the function of which is described in detail below.

Figure 25:
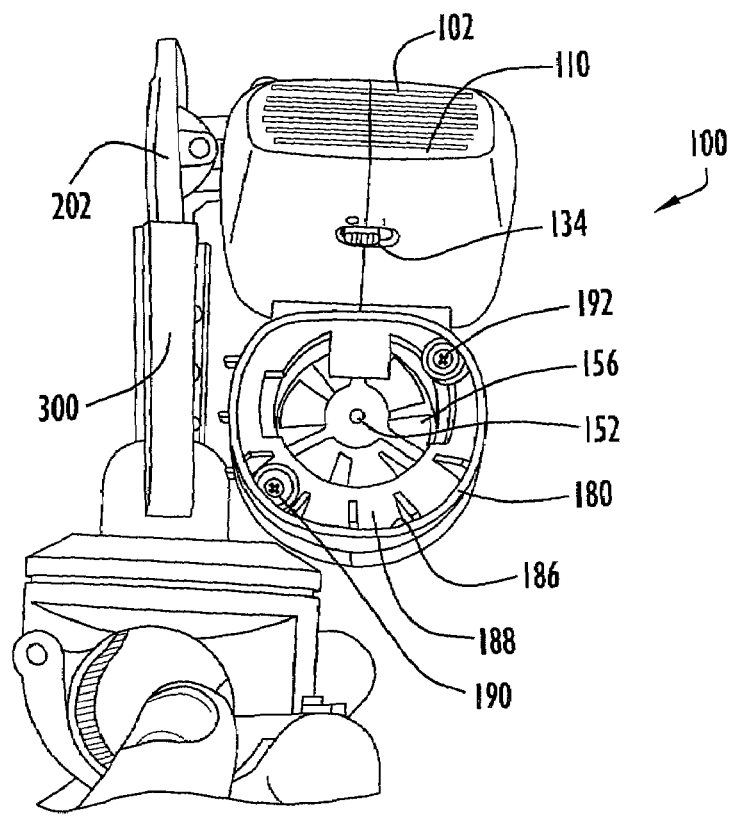
FIG. 25 is a rear view of the electronic device illustrated in FIG. 21.

Referring to FIG. 25, a rear view of the electronic device 100 is illustrated. As shown, the body 102 includes a switch 134 on a lower surface proximate to the rear end 110 of the device 100. The switch 134 is used to turn the device 100 on and off. The lower portion 106 also includes a rear housing portion 152 that has several spaced apart openings 156 formed therein. The openings 156 are configured to allow air to flow through the rear housing portion 152. In this embodiment, the front housing portion 150 and the rear housing portion 152 support a rotatably mounted propeller therebetween. As air flows through the openings 154 and 156, the air causes the propeller to rotate in the lower portion 106. The rear portion 180 includes an inner surface 186 with an internally projecting wall 188 that is used to maintain the rear housing portion 152 within the lower portion 106. Several connectors 190 and 192, such as screws, are used to couple the rear portion 180 to the main portion 141 of the lower portion 106.

Figure 26:
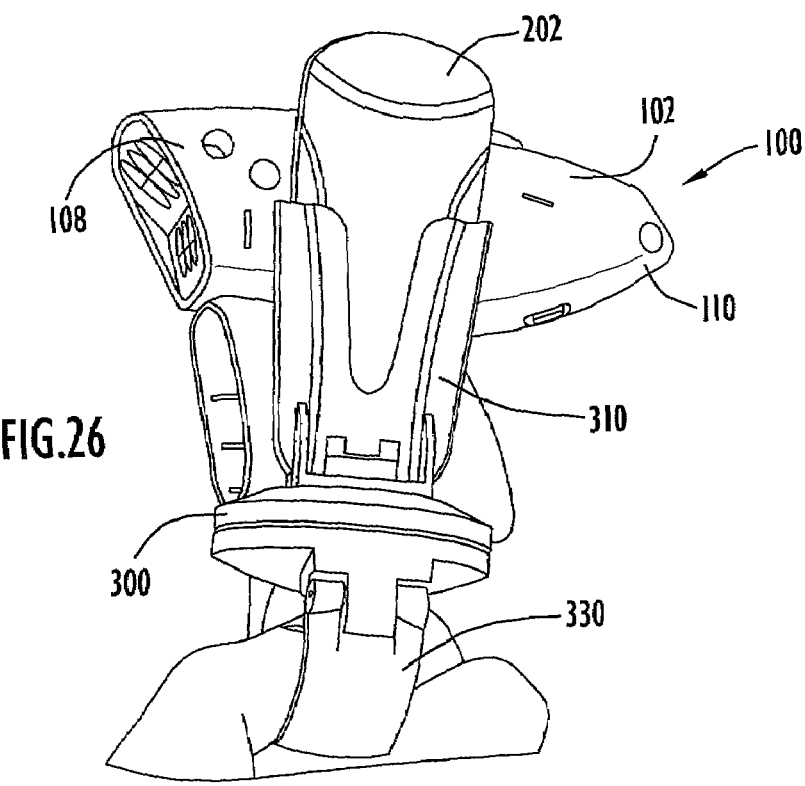
FIG. 26 is an alternative side view of the electronic device illustrated in FIG. 21.

Referring to FIG. 26, another side view of the electronic device 100 is illustrated. As shown, the mounting portion 300 is connected to the coupling structure or component 200 of the device 100. The mounting portion 300 includes a first portion 310 that is configured to receive a portion of and be connected to the coupling portion 202. The mounting structure 300 includes a second portion 330 that is configured to be coupled to an article or object. In this embodiment, the first portion 310 and the second portion 330 are rotatably or pivotally coupled to each other. Accordingly, when the second portion 330 of the mounting portion 300 is secured to an object, the first portion 310 can rotate relative to the second portion 330 so that the channel 142 is oriented in the desired direction in which the air will be flowing. In other embodiments, the first portion 310 and the second portion 330 may be fixed relative to each other or may move in a manner different than a rotating motion.

Figure 27:
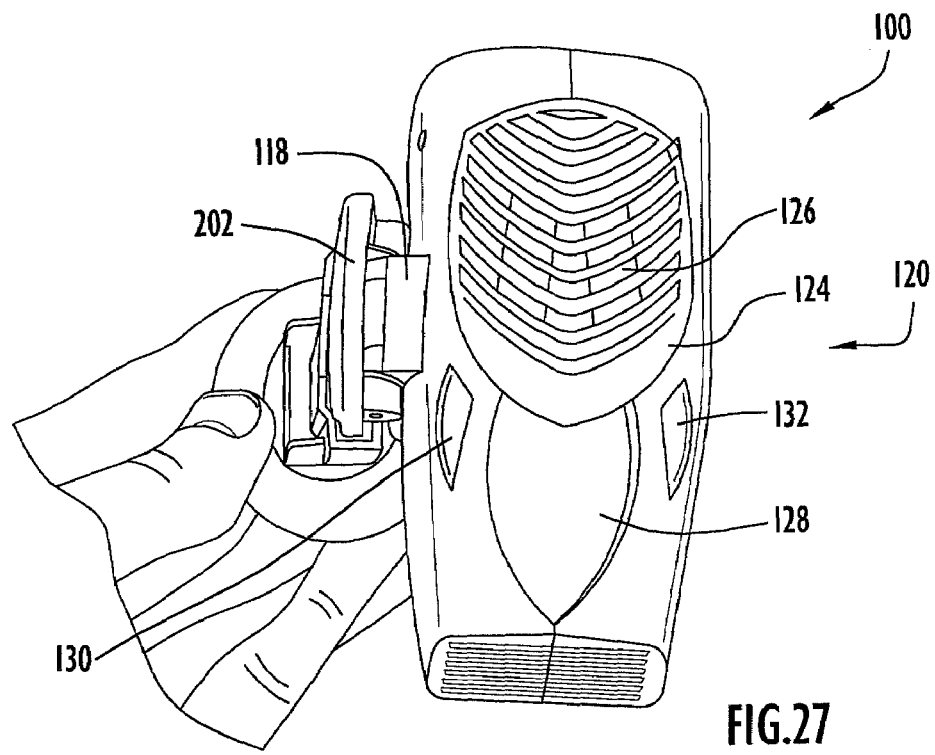
FIG. 27 is a top view of the electronic device illustrated in FIG. 21.

Referring to FIG. 27, a top view of the electronic device 100 is illustrated. As shown, the device 100 includes an output generating system or device 120. The system 120 includes a speaker with a speaker plate 124 with openings 126 formed therein through which audible outputs can be heard. As shown, the body 102 includes a shoulder 118 projecting from one side. The shoulder 118 has a through-hole (not shown) through which a connector such as a pin may be inserted to mount the coupling portion 202 to the body 102.

Figure 28:
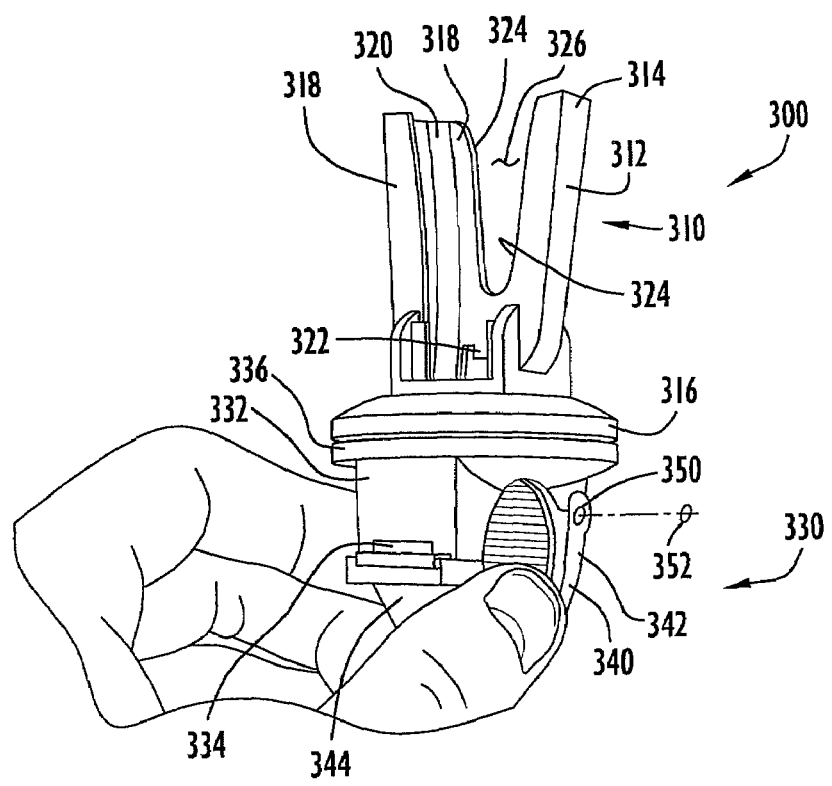
FIG. 28 is a perspective view of the mounting portion of the electronic device illustrated in FIG. 21.
Figure 29:
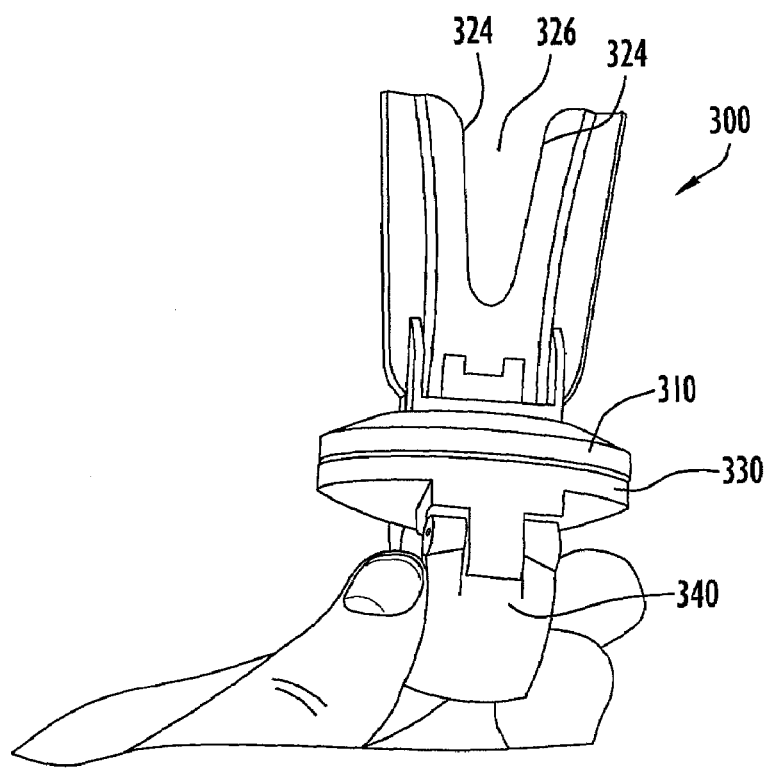
FIG. 29 is a side view of the mounting portion illustrated in FIG. 28.
Figure 30:
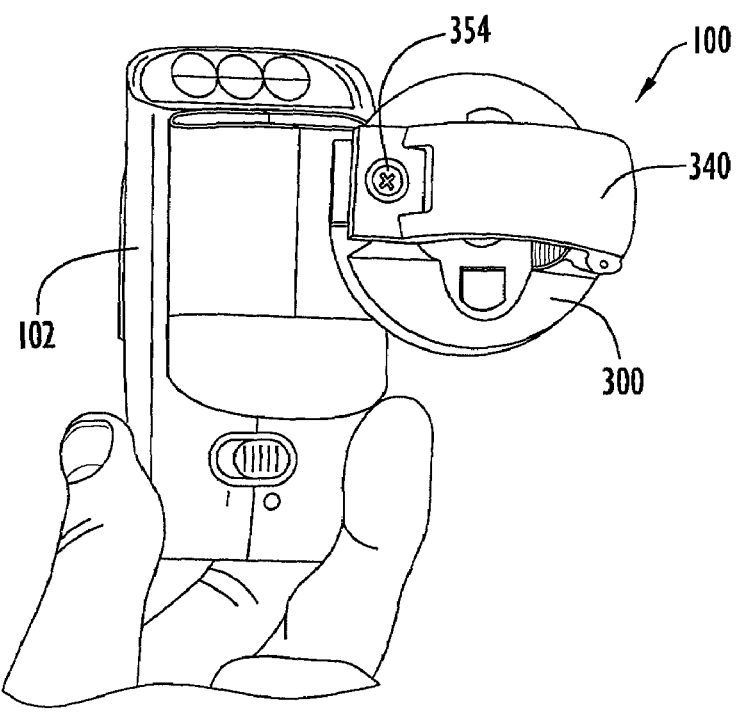
FIG. 30 is a bottom view of the electronic device illustrated in FIG. 21.

Referring to FIGS. 28-31, an embodiment of the mounting portion 300 is illustrated and described. As shown in FIGS. 28 and 29, the mounting portion 300 has a first portion 310 and a second portion 330. As previously described, the first portion 310 is configured to be connected to a portion of the electronic device 100 and the second portion 330 is configured to be connected to a separate article or object.

In this embodiment, the first portion 310 includes a body 312 that has opposite ends 314 and 316. The body 312 also includes walls 318 that define a receptacle 320 near the bottom of which is an inwardly extending projection 322. The walls 318 are configured to have the same profile and shape as that of the coupling portion or plate 202. In this embodiment, the walls 318 have a slightly tapered configuration with surfaces 324 that form a notch 326 therebetween.

Figure 31:
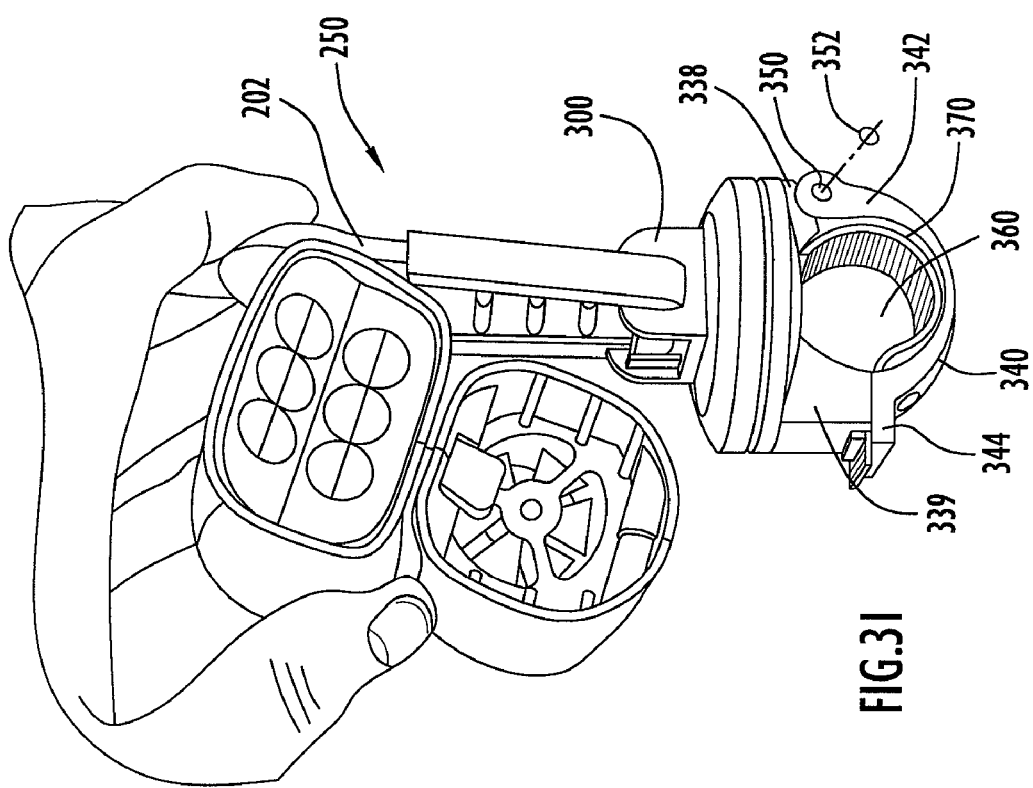
FIG. 31 is a front view of the electronic device illustrated in FIG. 21 in a receiving configuration.

As shown in FIGS. 28-31, the second portion 330 includes a body 332 that has opposite ends 334 and 336. The body 332 has extensions 338 and 339 to which a latch member 340 is connected. As shown in FIG. 31, one end 342 of latch member 340 is pivotally coupled to extension 338 by a connector 350, such as a pin or rod, which defines a pivot axis 352. The opposite end 344 of latch member 340 is releasably coupled to extension 339 using a conventional fastener 354, such as a screw. The latch member 340 is configured to form an opening 360 between the latch member 340 and the body 332 of the mounting portion 330. The opening 360 is shaped to receive an article or object such as a rod or a bar. A flexible member such as a plastic or rubber strap 370 is disposed in the opening 360. The flexible member 370 can have a textured surface that enhances the frictional contact and the gripping of the object to which the device 100 is secured. A user can remove the fastener 354, pivot latch member 340 about axis 352 and insert the article or object to which the device 100 is to be mounted into the opening 360. Then the latch member 340 can be pivoted to a closed position and the fastener 354 subsequently secured.

Figure 32:
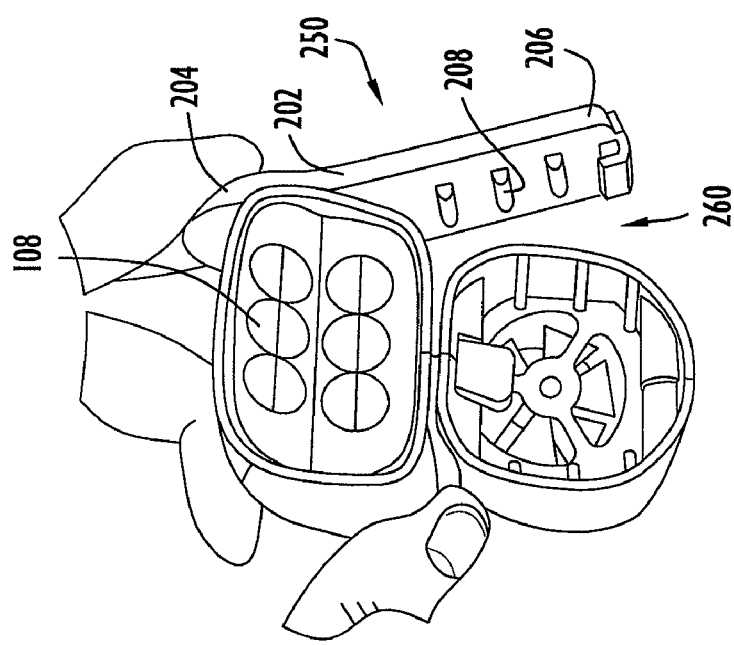
FIG. 32 is a front view of the electronic device illustrated in FIG. 31 without a mounting portion.

The electronic device 100 can be used with or without the mounting component 300. In one exemplary use, a user can carry the electronic device 100 around in his or her hand. In another exemplary use, the electronic device 100 can be mounted on an article or object using the coupling component 220. For example, the user can couple the device 100 to an article of clothing or to an accessory. Referring to FIG. 32, a user can apply a force proximate to end 204 of coupling portion 202 to pivot the coupling 202 to the receiving configuration or position 250 as illustrated. An object or article can be inserted into the area 260 created between the inner surface 208 of the coupling portion 202 and the body 102.

Figure 33:
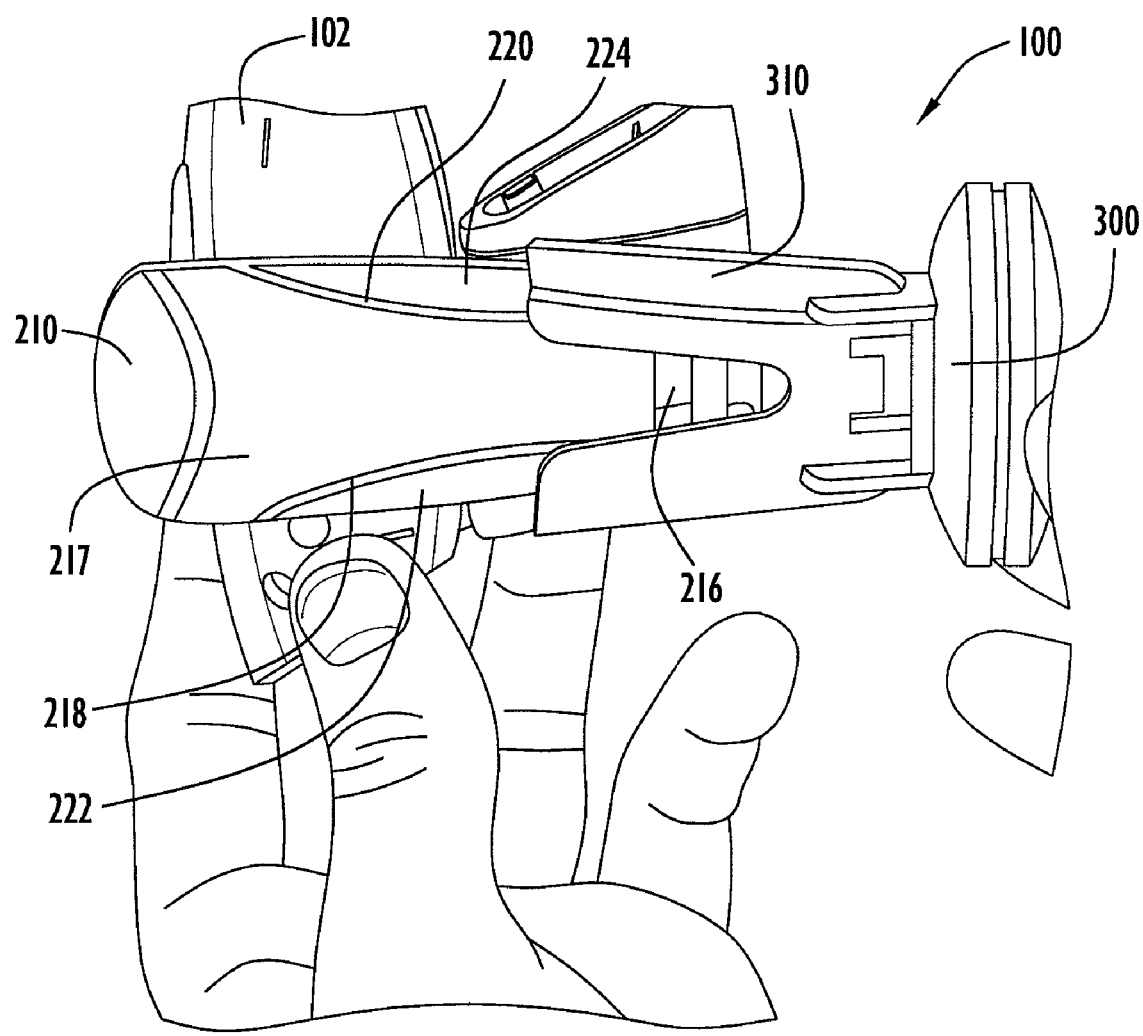
FIG. 33 is a side view of the electronic device illustrated in FIG. 21 illustrating the coupling of the mounting portion on the device.

In another exemplary use, the electronic device 100 can be mounted on an article or object using the mounting portion 300. Referring to FIG. 33, the connection of the mounting portion 300 to the coupling portion 200 is illustrated. The coupling portion 200 includes an outer surface 210 with a raised portion 217 with side surfaces 218 and 220 that form recesses or recessed portions 222 and 224. The recesses 222 and 224 are configured to be engaged by corresponding surfaces on the mounting portion 300. The coupling portion 202 has an opening 216 into which the projection 322 of the mounting component 300 is inserted or snapped into to secure the portions 202 and 300 together. When the projection 322 is disengaged from the opening 216, the portions 202 and 300 can be separated.

Figure 34:
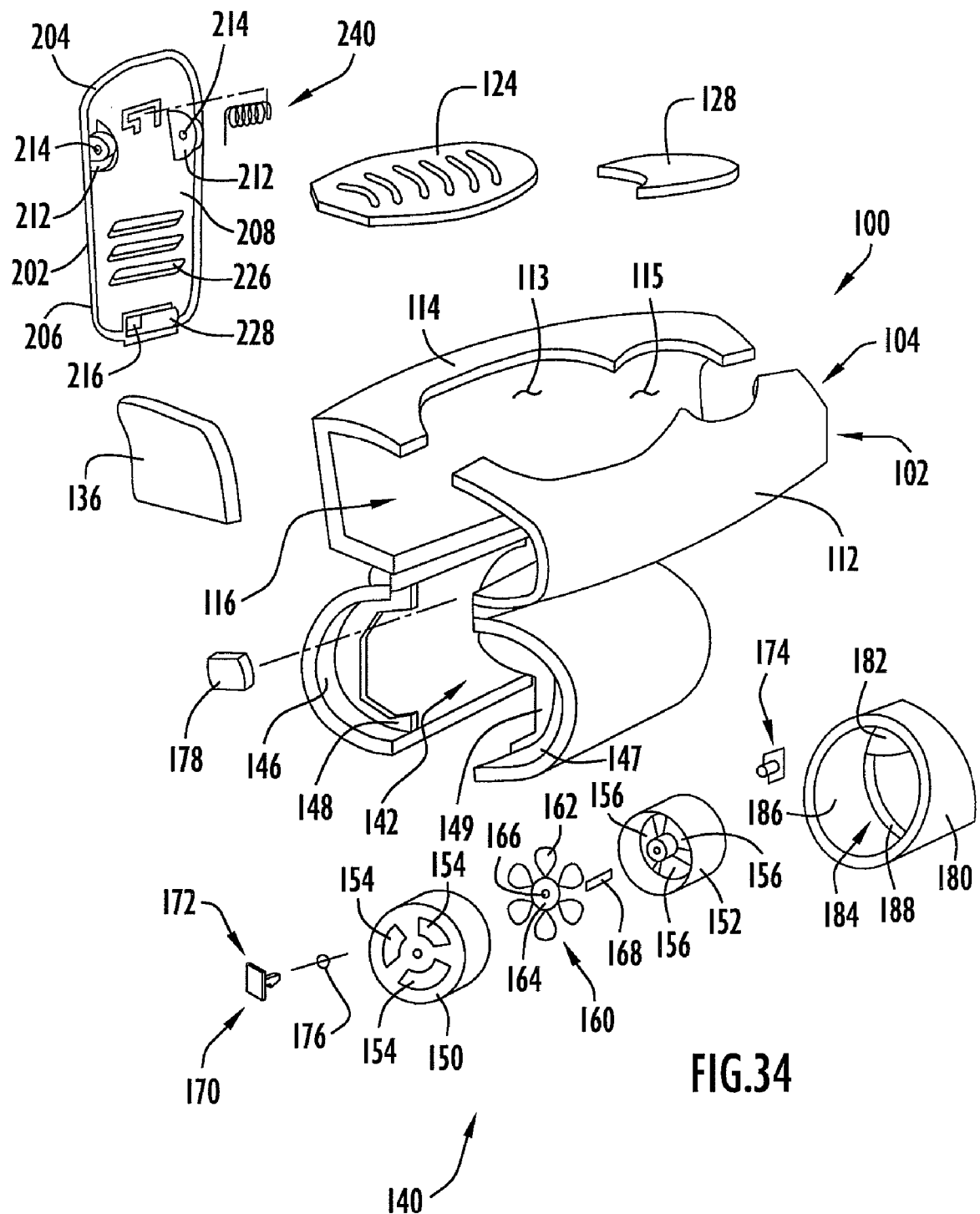
FIG. 34 is an exploded assembly view of the electronic device illustrated in FIG. 21.

Referring to FIG. 34, an exploded assembly view of the electronic device 100 is illustrated. In this embodiment, the body 102 of the device 100 is formed in two sections 112 and 114 which are coupled together using fasteners, a snap-fit arrangement, and/or an adhesive. The upper parts of the sections 112 and 114 form the upper portion 104 and an interior region 116 in which electronic components, including a power supply such as one or more batteries, can be located. The upper surfaces of the sections 112 and 114 include recesses that form openings 113 and 115 in which the speaker plate 124 and the display screen 128 can be disposed, respectively. The front portion of the interior region 116 is open and can be closed by a cover 136 that can be mounted to the body 102. The two lower parts of sections 112 and 114 collectively form the main portion 141 of lower portion 106. The rear portion 180 can be coupled to the main portion 141 as previously described. As shown in FIG. 34, the inner surfaces 146 and 147 of the parts of the lower portions include walls 148 and 149, respectively. In this embodiment, walls 148 and 149 are integrally formed, such as by molding, with the remainder of the respective section 112 or 114. In other embodiments, the walls may be formed separately and subsequently coupled to the respective inner surface using any conventional technique.

The device 100 includes a speed measuring component or device 140. In this embodiment, the speed measuring component includes a propeller 160 and a sensor 170. The sensor 170 is an infrared light sensor with a light emitter 172 that generates a light beam 176 and a light receiver 174 that is positioned to receive or detect the presence or absence of the light beam.

As previously described, the front housing portion 150 has several openings 154 through which air can pass. Similarly, the rear housing portion 152 has several openings 156 through which air can pass. Propeller 160 is a molded plastic article that has several blades 162 that are supported by a center portion 164. The center portion 164 includes a central hole 166 through which a shaft 168 is inserted to movably mount the propeller 160 between the housing portions 150 and 152. The air passing through openings 154 and 156 engages the blades 162 and causes the propeller 160 to rotate. As the propeller 160 rotates, the blades 162 repeatedly interrupt the light beam 176 of the sensor 170. The quantity and frequency of interruptions of the light beam 176 can be determined and correlated to an estimated speed of the air flow through the lower portion 106. The number of pulses/interruptions detected by the sensor correlates to a program that is written into a code of a data table. The data table defines the relationship between the quantity of pulses and air speed and sets forth the appropriate audible and visual outputs to be generated. Air flow in either direction through the lower portion 106 can cause the propeller 160 to rotate. The components of the sensor 170 are configured so that the light beam 176 extends through one of the openings 154 and one of the openings 156.

Also shown in FIG. 34 is the rear section 180 of the lower portion 106. The rear section 180 includes an inner surface 186 that defines a passageway or channel 184. A wall 188 is formed that retains the rear housing portion 152 in the lower portion 106. To increase the accuracy of the detection of the light beam by the sensor 170 and reduce the risk of errors due to ambient light, light blocking members 178 and 182 are disposed proximate to opposite ends of the speed measuring device 140. While light blocking members 178 and 182 are illustrated as small plastic pieces in this embodiment, the members can be made of any material and can be formed in any size or configuration.

Also shown is an embodiment of the coupling portion 202. Coupling portion 202 has ends 204 and 206 and an inner surface 208 that includes several ribs 226 formed thereon. Proximate to lower end 206 is an opening 216 through which a projection 322 on the mounting portion 330 can be inserted. The coupling portion 202 also includes a projection 228 that has a curved shape and is oriented inwardly. Projection 228 is used when securing the device 100 to an object. The coupling portion 202 includes extensions 212, each of which has a hole 214 through which a connector can be inserted to pivotally mount the coupling portion 202 to the shoulder 118 on the body 102. A biasing mechanism 240, such as a spring, biases the coupling portion 202 into a clamping position toward the body 102.

Figure 35:
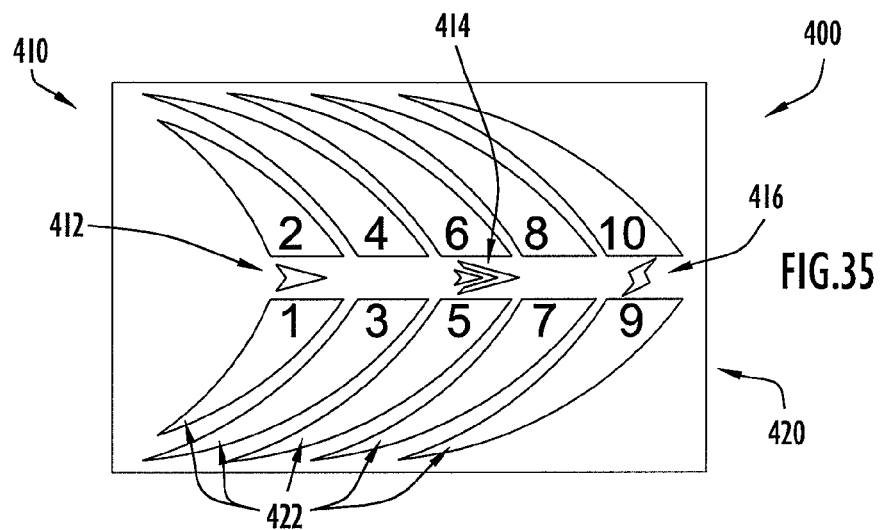
FIG. 35 illustrates an embodiment of a visual output generated by the electronic device according to the present invention.

An embodiment of a visual output or output display is illustrated in FIG. 35. In this embodiment, the output display 400 includes a mode portion 410 and a speed portion 420. The mode portion 410 includes a running mode indicator 412, a bike mode indicator 414, and a record mode indicator 416. The speed portion 420 includes several bars or elements 422. As illustrated, in this embodiment, there are ten different bars or elements 422, each of which has a different number located thereon. The elements 422 are illuminated in chronological order as the speed (air flow) increases. Each of the elements represents a particular speed range and indicates that a certain speed level has been reached.

Figure 36:
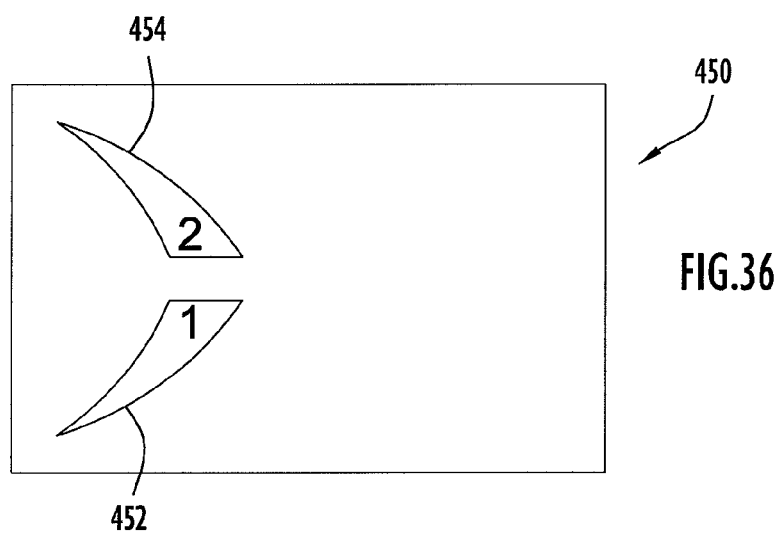
FIGS. 36 and 37 illustrate different visual outputs generated by the electronic device according to the present invention.

Referring to FIG. 36, an embodiment of a visual output is illustrated. Visual output 450 is an exemplary visual output that can be generated by the visual output device. Visual output 450 includes two elements that are displayed. Element 452 includes the number 1 and element 454 includes the number 2. When the speed measuring device 140 does not sense or detect any air flow, no elements are displayed by the visual output device. As the electronic device 100 starts to move, air begins to flow through the measuring device 140 and the propeller 160 begins to rotate. As the propeller 160 begins to rotate, element 452 is initially displayed. As the rotation of the propeller 160 increases, and a particular speed level is reached, element 454 is then displayed in addition to element 452. The combination of elements 452 and 454 are indicative of a particular speed of the device 100 or air flow.

Figure 37:
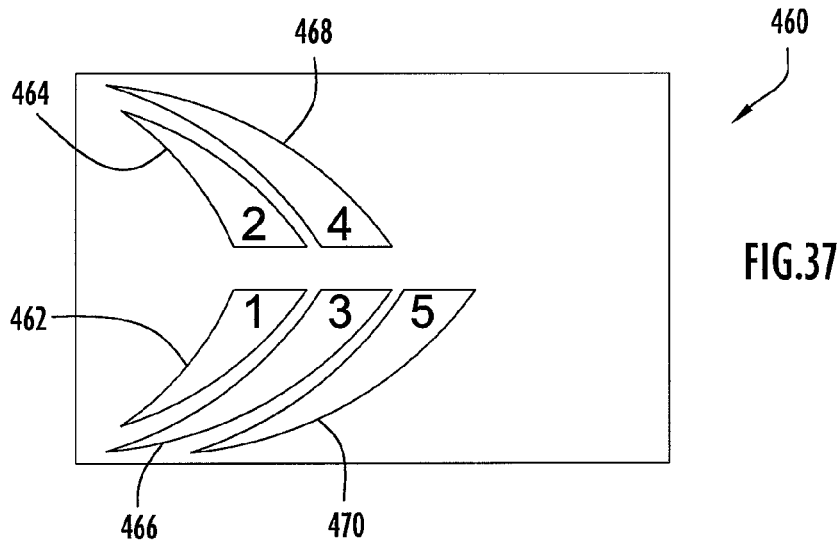

Referring to FIG. 37, another embodiment of a visual display is illustrated. In this embodiment, visual display 460 includes several elements that are displayed. In particular, elements 462, 464, 466, 468, and 470 are displayed with the numbers 1, 2, 3, 4, and 5, respectively. Visual display 460 is indicative of a faster movement of the device 100, or a greater speed or flow of air, because it contains more elements than visual display 450. As the device 100 moves faster from the speed indicated by visual display 450, element 466 (number 3) is displayed, element 468 (number 4) is displayed, and then element 470 (number 5) is displayed. Additional elements can be displayed as the propeller rotates faster, which means that the device 100 is moving faster. As the device 100 slows down, the flow of air through the lower portion 106 decreases and the rotational speed of the propeller decreases. As a result, the frequency at which the light beam is interrupted decreases and the highest numbered element is removed from the display. As the device slows, the next highest numbered element is no longer displayed. Accordingly, as the air flow speed increases, additional elements are displayed in chronological order. Similarly, as the air flow speed decreases, elements are no longer displayed and are removed in reverse chronological order.

In addition to the visual outputs described above, the output generating system also generates audible outputs, such as sounds or sound effects. In one embodiment, the audible outputs are sound effects that resemble the revving and/or operating sounds of a vehicle. When there is no air flow, the output generating system does not generate any audible outputs. As the air flow starts, the output generates sound effects at a low volume level. As the speed of the air flow increases, the pitch of the generated sound effects increases. As the speed of the air flow decreases, the pitch of the generated sound effects decreases. As previously discussed, visual output 450 is representative of a speed that is less than the speed represented by visual output 460. Accordingly, the audible output generated by the output generating system when visual output 460 (for a higher speed) is displayed is at a higher pitch than the audible output generated by the output generating system when visual output 450 (for a lower speed) is displayed. In other embodiments, the volume of the generated audible output can change either in addition to or instead of the pitch of the generated audible output. Accordingly, the audible output generated by the output generating system when visual output 460 is displayed is louder than the audible output generated by the output generating system when visual output 450 is displayed.

When button 132 is pressed, the device 100 begins a start-up sequence and generates an audible output and displays the running mode indicator 412. When button 132 is pressed again, a different audible output is generated and the mode indicator changes from running mode to cycling mode. At the same time, the running mode indicator 412 is changed to the cycling mode indicator 414. In one embodiment, when button 130 is pressed, an audible output is generated and sequence of alternating combinations of elements is displayed. In another embodiment, button 130 can be used for a recording feature in which a certain level of audible output is stored.

In other embodiments, the sizes, shapes and locations of the elements displayed as a visual output can vary. The manner in which the elements are displayed can also vary. For example, the elements can be formed as a continuous bar that lengthens or shortens with variations in speed. While the elements 422 in the illustrated embodiment have different colors, the elements may be the same color in other embodiments.

In one embodiment, the various components of the housing 102 and the speed measuring device 140 are made of a molded plastic material. In other embodiments, the materials of the components can vary.

Figure 38:
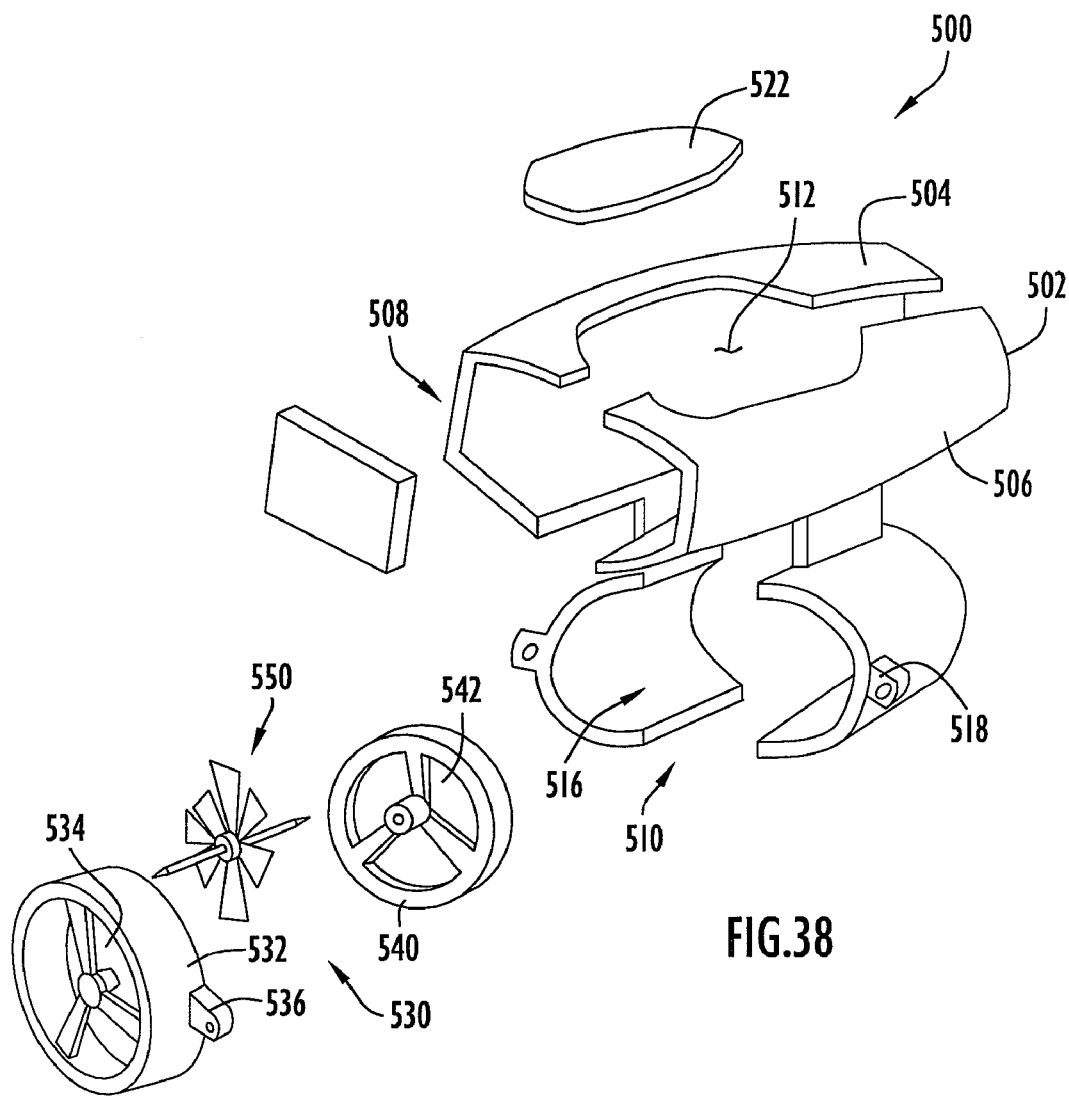
FIGS. 38 and 39 are exploded perspective and cross-sectional views of an alternative embodiment of an electronic device according to the present invention.
Figure 39:
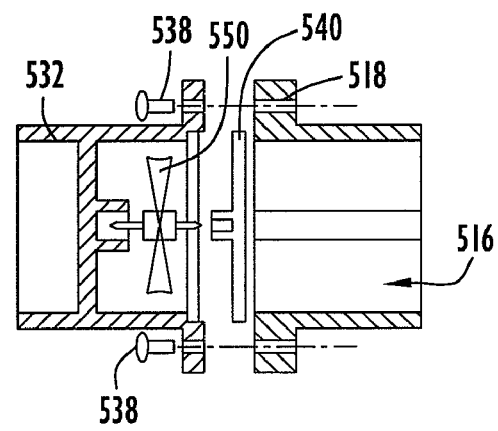

In different embodiments, the configuration of the electronic device can vary. Several exemplary variations are illustrated in FIGS. 39-42. In FIGS. 38-39, an embodiment of an electronic device 500 is illustrated. Device 500 includes a body 502 that is formed of two sections 504 and 506. Each section includes a part that forms part of the upper portion 508 of the body 502 and a part that forms part of the lower portion 510 of the body 502. The sections 504 and 506 define an opening 512 into which a portion of an output generating system 522 can be inserted. Device 500 includes a speed measuring device 530 that includes a propeller 550 that is captured between a front housing portion 532 with openings 534 and an inner plate 540 with openings 542. The inner plate 540 is disposed and retained within the channel 516. The front housing portion 532 is coupled to the lower portion 510 of the body 502 using connectors 538 which secure tab 536 to tab 518 on each side of the device 500.

Figure 40:
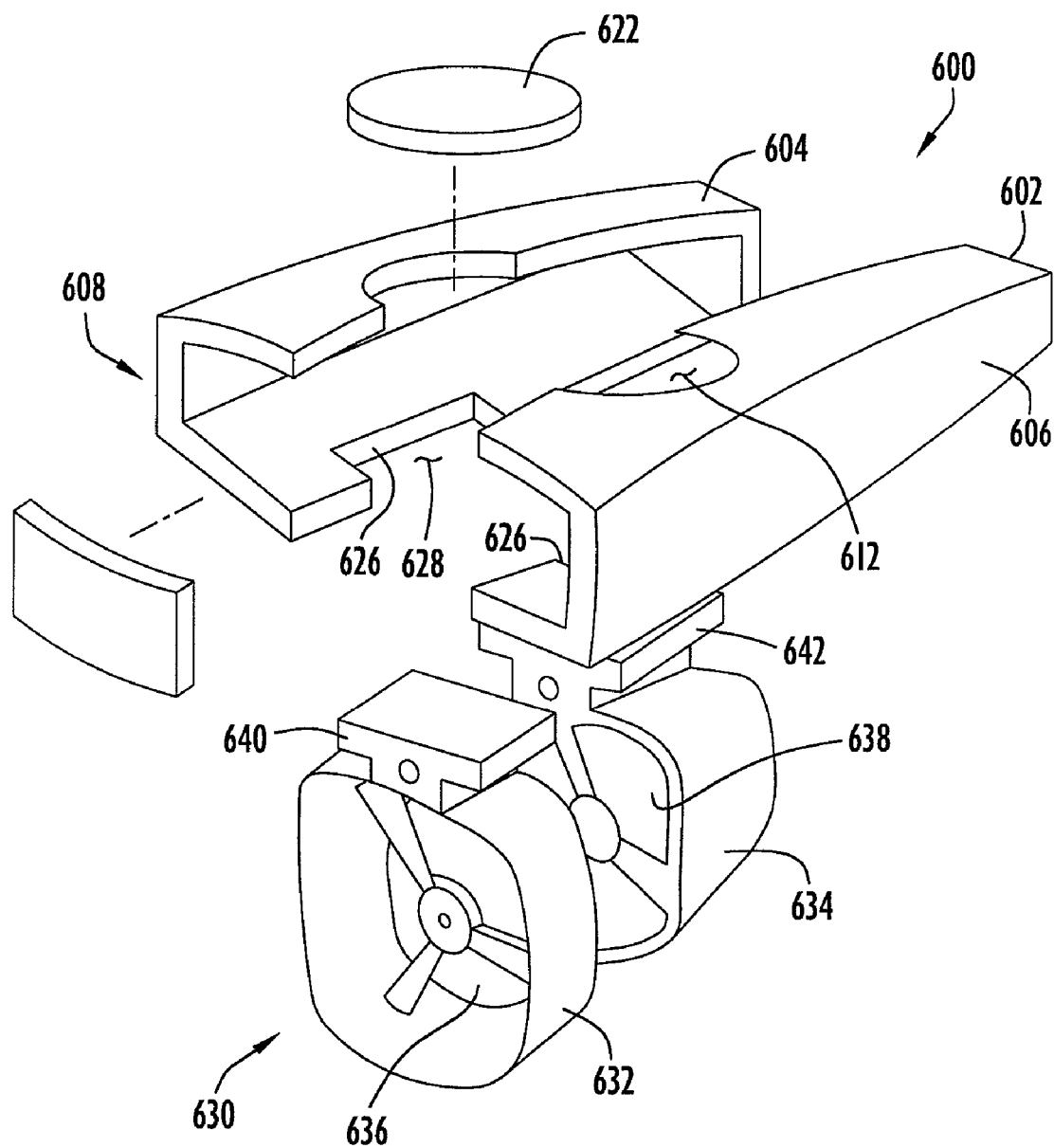
FIG. 40 is an exploded perspective view of an alternative embodiment of an electronic device according to the present invention.

Another embodiment of an electronic device is illustrated in FIG. 40. In this embodiment, electronic device 600 has a body 602 that is formed in two sections 604 and 606, which collectively define an upper portion 608 of the body 602. The sections 604 and 606 define an opening 612 into which a portion of an output generating system 622 can be disposed, such as a speaker grill. The device 600 includes a speed measuring device 630 that has a front section 632 with openings 636 and a rear section 634 with openings 638. A propeller (not shown) is disposed between the front section 632 and the rear section 634. Each of the sections 604 and 606 has a surface 626 that defines a portion of an opening 628 into which portions 640 and 642 of sections 632 and 634 are trapped and retained when sections 604 and 606 are coupled together.

Figure 41:
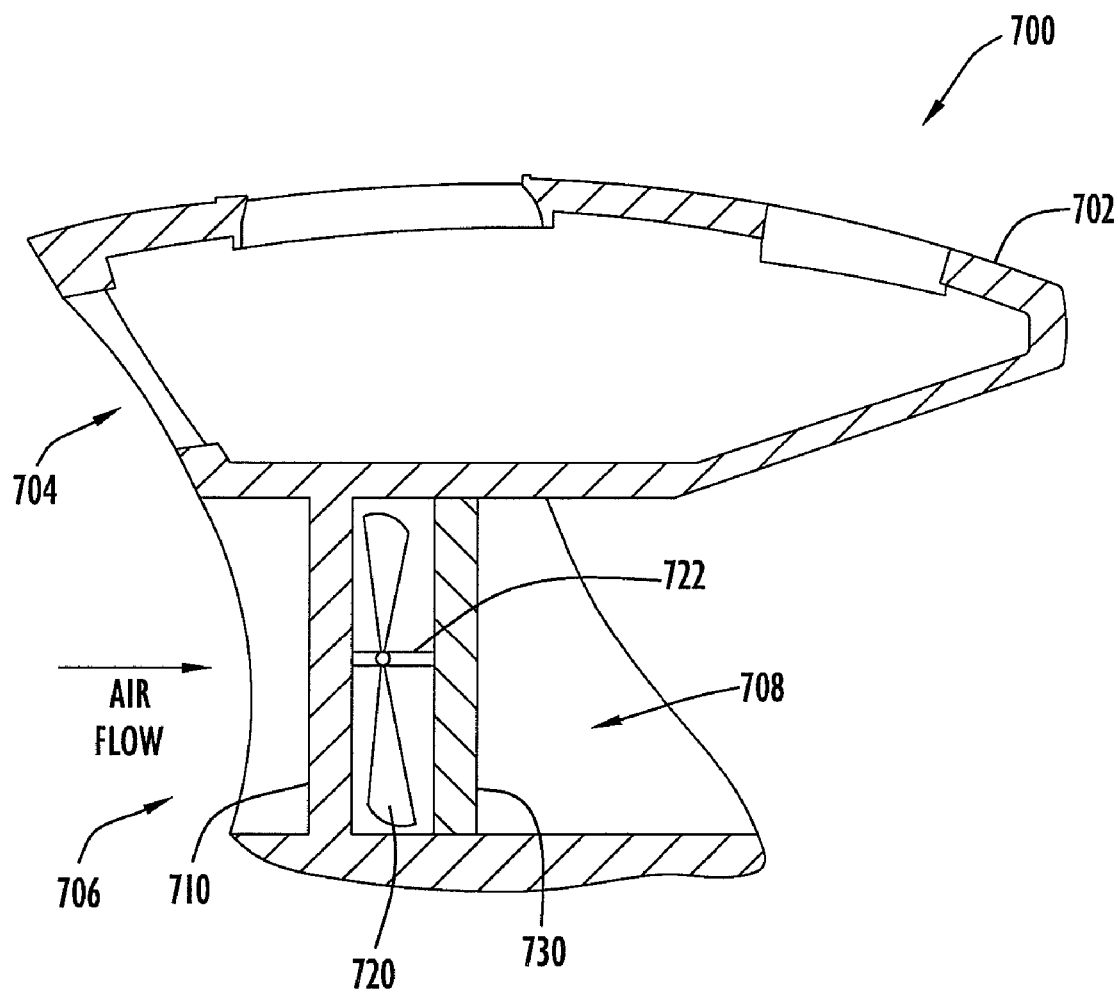
FIG. 41 is a cross-sectional view of an alternative embodiment of an electronic device according to the present invention.

Another embodiment of an electronic device is illustrated in FIG. 41, in which a cross-section view is illustrated. In this embodiment, electronic device 700 has a body 702 that defines an upper portion 704 and a lower portion 706. The lower portion 706 includes a plate 710 that is integrally formed with the lower portion 706. The plate 710 includes openings (not shown) through which air can flow. A propeller 720 is rotatably mounted to the plate 710. A cap 730 is slid into the channel 704 of the lower portion 706 and the shaft 722 on which the propeller 720 is mounted is coupled thereto. The cap 730 is then secured in the lower portion 706.

Figure 42:
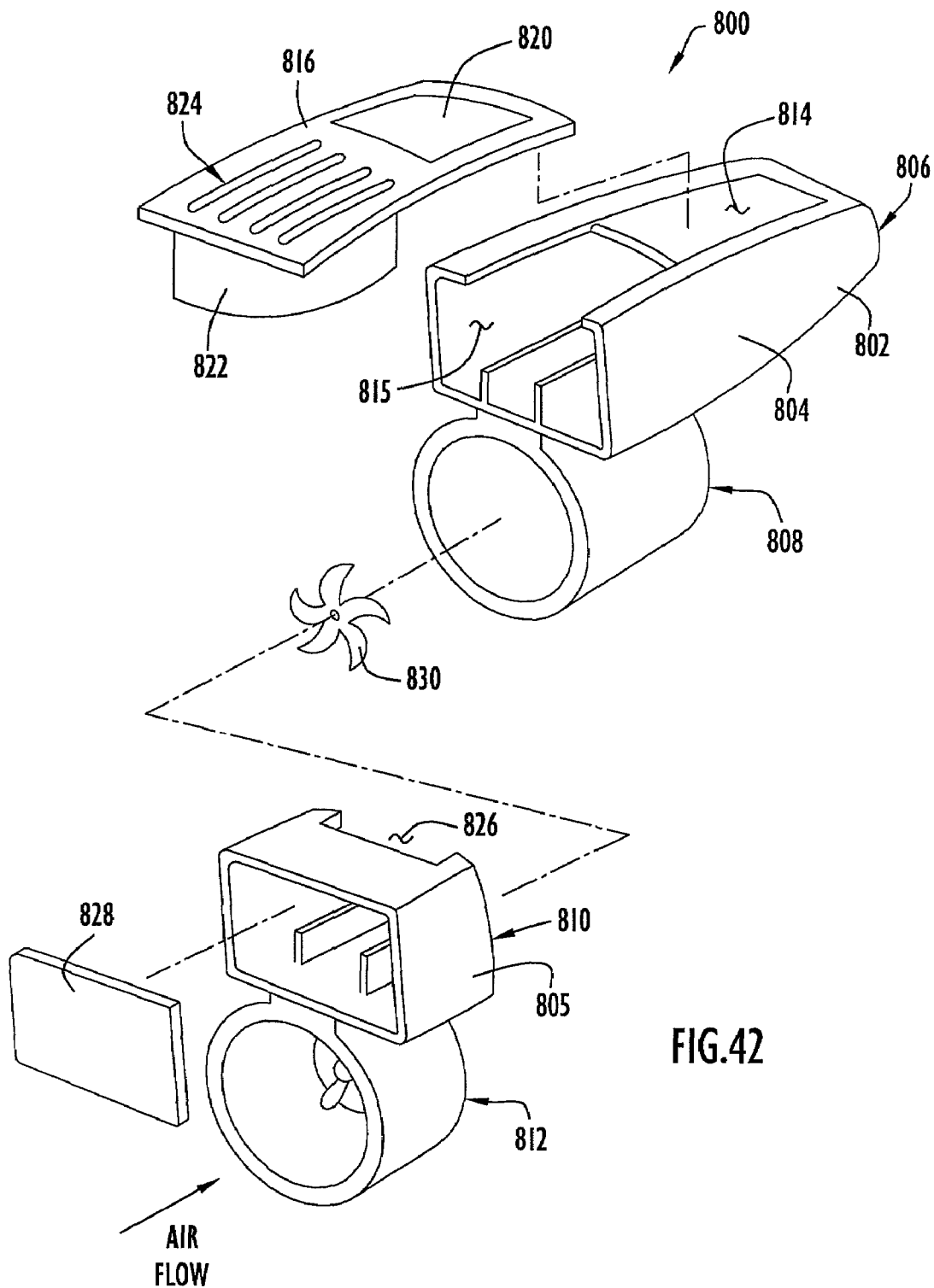
FIG. 42 is an exploded perspective view of an alternative embodiment of an electronic device according to the present invention.

Another embodiment of an electronic device is illustrated in FIG. 42. In this embodiment, electronic device 800 includes a body 802 with a first section 804 with an upper portion 806 and a lower portion 808 and a second section 805 with its own upper portion 810 and lower portion 812. The upper portion 806 defines a recess 814 and an opening 815 into which an output generating system 816 can be inserted. The output generating system 816 includes a visual output device 820 and an audible output device 822 that is proximate to a speaker grill 824. The second section 805 includes a recess 826 that accommodates a portion of the output generating system 816. A cover 828 can be mounted to the second section 805 to close the interior region. A propeller 830 can be mounted in and secured to lower portions 808 and 812.

While embodiments of a wearable device for measuring acceleration, displacement, inclination, and speed and methods of performing activities using such a wearable device have been particularly shown and described, many variations may be made therein. This disclosure may include one or more independent or interdependent inventions directed to various combinations of features, functions, elements and/or properties. Such variations, whether they are directed to different combinations or directed to the same combinations, whether different, broader, narrower or equal in scope, are also regarded as included within the subject matter of the present disclosure. Accordingly, the foregoing embodiments are illustrative, and no single feature or element, or combination thereof, is essential to all possible combinations that may be claimed in this or a later application. No invention described herein necessarily encompasses all features or combinations described. Where "a" or "a first" element or the equivalent thereof is recited, such includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated. While the invention has been described in detail and with references to specific embodiments thereof, it will be apparent to one skilled in the art that various changes and modifications can be made therein without departing from the spirit and scope thereof. Thus, it is intended that the present invention covers the modifications and variations of this invention.

What is claimed is:

1. A wearable electronic device configured to generate an output based on the flow of air relative to the device, the device comprising:
    a housing, the housing including a speed measuring device and an output generating system, the speed measuring device being configured to measure the relative speed of the air engaging the speed measuring device, the output generating system being configured to generate at least one output in response to the measured relative speed; and
    a coupling structure, the coupling structure being coupled to the housing, the coupling structure being configured to be coupled to an object so that the housing can be worn by a user.

2. The electronic device of claim 1, wherein the speed measuring device includes a propeller and a sensor, the sensor being configured to determine the rate of rotation of the propeller, which corresponds to the speed of air engaging the speed measuring device.

3. The electronic device of claim 2, wherein the sensor is an optical sensor.

4. The electronic device of claim 2, wherein the sensor includes a light emitter and a light receiver, the propeller includes several blades, and the blades being disposed between the light emitter and the light receiver so that the blades interrupt a beam of light between the light emitter and the light receiver.

5. The electronic device of claim 4, wherein the output generating system includes a visual output device and an audible output device, each of the visual output device and the audible output device generating an output in response to the speed of rotation of the propeller.

6. The electronic device of claim 1, wherein the output generating device is configured to generate a first output in response to a first speed and a second output in response to a second speed, the first output being different than the second output, and the first speed being less than the second speed.

7. The electronic device of claim 6, wherein the first output includes a first audible output, the second output includes a second audible output, the second audible output being different than the first audible output.

8. The electronic device of claim 7, wherein a pitch of the second audible output is higher than a pitch of the first audible output.

9. The electronic device of claim 6, wherein the first output includes a first visual output, the second output includes a second visual output, the second visual output being different than the first visual output.

10. The electronic device of claim 9, wherein the first visual output includes at least one element and the second visual output includes at least two elements.

11. The electronic device of claim 9, wherein the first visual output includes a first quantity of elements and the second visual output includes a second quantity of elements, the first quantity of elements being less than the second quantity of elements.

12. The electronic device of claim 1, wherein the speed measuring instrument is an anemometer.

13. The electronic device of claim 1, wherein the housing includes an upper portion and a lower portion, the output generating system being disposed in the upper portion, and the speed measuring device is disposed in the lower portion.

14. The electronic device of claim 1, wherein the coupling structure is pivotally mounted to the housing and movable between a clamping position and a receiving position, the coupling structure being biased into the clamping position by a biasing member.

15. The electronic device of claim 14, wherein the coupling structure includes a mounting portion releasably coupled thereto, the mounting portion being configured to be secured to the object.

16. The electronic device of claim 15, wherein the mounting portion includes a first portion configured to be connected to the coupling portion and a second portion configured to be secured to the object, the first portion and the second portion being movably connected together to allow relative positioning of the electronic device relative to the object.

17. A wearable speed measuring device that generates an output based on a flow of air, the device comprising:
    a body;
    an air flow instrument, the air flow instrument being coupled to the body, the air flow instrument being configured to determine the speed of a flow of air relative to the device;
    an electronic system, the electronic system being operatively coupled to the air flow instrument, the electronic system including an output generating device, the output generating device being configured to generate a first output in response to a first speed of an air flow detected by the air flow instrument and a second output in response to a second speed of an air flow detected by the air flow instrument, the first speed being different than the second speed, and the first output being different than the second output; and
    means for mounting the body, the means for mounting being coupled to the body, the means for mounting being configured to couple the body to an object.

18. The wearable speed measuring device of claim 17, wherein the air flow instrument includes a rotatably mounted propeller and a sensor, the sensor being disposed so that the sensor can determine the speed of rotation of the propeller.

19. The wearable speed measuring device of claim 17, wherein the sensor includes a light emitter that is configured to generate an infrared light beam and a light detector that is configured to detect a light beam, the light emitter and the light detector being disposed on opposite sides of the propeller so that a portion of the propeller passes between the light emitter and the light detector and interrupts the light beam.

20. The wearable speed measuring device of claim 17, wherein the first output includes a first audible output and a first visual output, the second output includes a second audible output and a second visual output, the first audible output being different than the second audible output and the first visual output being different than the second visual output.

21. A portable output generating device that generates audible outputs in response to the flow of air relative to the device, the device comprising:
    a housing, the housing being configured to be coupled to an object so that the housing is supported by a user;

an air flow detector, the air flow detector being coupled to the housing, the air flow detector being configured to measure the speed of air flow relative to the housing; and an output generator, the output generator being configured to generate different audible outputs based on the different speeds of air flow measured by the air flow detector.

22. The portable output generating device of claim 21, wherein a volume of the audible outputs increases as the detected speeds increase, and the volume of the audible outputs decreases as the detected speeds decrease.

23. The portable output generating device of claim 21, wherein the output generator is configured to generate visual outputs, each of the visual outputs including at least one element, the quantity of elements displayed by the output generator as a visual output being determined by the detected speed of air flow.

24. The portable output generating device of claim 23, wherein the quantity of elements displayed increases as the detected speed increases and the quantity of elements displayed decreases as the detected speed decreases.

25. The portable output generating device of claim 23, wherein each of the elements includes a number, and the displayed elements are displayed chronologically. Image Page 18

26. An electronic device wearable by a user, the electronic device comprising:
   a speed measuring device configured to measure the relative speed of the air engaging the speed measuring device;
   a housing containing the speed measuring device;
   a coupling structure coupled to the housing, the coupling structure enabling the housing to be worn by a user; and
   an output generating system configured to generate at least one output in response to the relative speed measured by the speed measuring device.

27. The electronic device of claim 26, wherein the speed measuring device includes a propeller and a sensor, the sensor being configured to determine the rate of rotation of the propeller, which corresponds to the speed of air engaging the speed measuring device.

28. The electronic device of claim 27, wherein the output generating system includes at least one of a visual output device and an audible output device, the at least one of the visual output device and the audible output device generating an output in response to the speed of rotation of the propeller.

29. A wearable speed measuring device, comprising:
   an air flow device configured to detect a flow of air;
   an electronic system connected to the air flow device, the electronic system including an output generating device configured to generate different outputs in response to different speeds of air flow detected by the air flow device; and
   a clip coupled to the air flow device, the clip being configured to be coupled to an object so that the air flow device can be worn by a user.

30. The wearable speed measuring device of claim 29, wherein the output generating device generates a first output in response to a first air flow speed and a second output in response to a second air flow speed, the second air flow speed being different than the first air flow speed, the first output being a first audible output, the second output being a second audible output, the first audible output being different than the second audible output in at least one of a pitch and a volume level.

31. The wearable speed measuring device of claim 29, wherein the output generating device generates a first output in response to a first air flow speed and a second output in response to a second air flow speed, the second air flow speed being different than the first air flow speed, the first output being a first visual output, the second output being a second visual output, the first visual output being different than the second visual output.

* * * * *